United States Patent
Song

(10) Patent No.: US 10,401,882 B2
(45) Date of Patent: Sep. 3, 2019

(54) ARTIFICIAL INTELLIGENCE AIR CONDITIONER SYSTEM AND METHOD OF CONTROLLING AN AIR CONDITIONER SYSTEM

(71) Applicant: LG ELECTRONICS INC., Seoul (KR)

(72) Inventor: Yujin Song, Changwon-si (KR)

(73) Assignee: LG Electronics Inc., Seoul (KR)

(*) Notice: Subject to any disclaimer, the term of this patent is extended or adjusted under 35 U.S.C. 154(b) by 613 days.

(21) Appl. No.: 14/337,610

(22) Filed: Jul. 22, 2014

(65) Prior Publication Data

US 2015/0051739 A1 Feb. 19, 2015

(30) Foreign Application Priority Data

Jul. 22, 2013 (KR) ........................ 10-2013-0086303

(51) Int. Cl.
| | | |
|---|---|---|
| G05D 23/19 | (2006.01) | |
| G05B 15/02 | (2006.01) | |
| F24F 11/30 | (2018.01) | |
| F24F 11/54 | (2018.01) | |

(Continued)

(52) U.S. Cl.
CPC .......... G05D 23/1917 (2013.01); F24F 11/30 (2018.01); G05B 15/02 (2013.01); *F24F 11/52* (2018.01); *F24F 11/54* (2018.01); *F24F 11/58* (2018.01)

(58) Field of Classification Search
CPC . G05D 23/1917; G05B 15/02; F24F 11/0086; F24F 2011/0091; F24F 2011/0067; F24F 2011/0071
See application file for complete search history.

(56) References Cited

U.S. PATENT DOCUMENTS 7,904,186 B2 * 3/2011 Mairs ................... G09B 29/007
700/19
2002/0029096 A1 3/2002 Takai et al. ................... 700/276
(Continued)

FOREIGN PATENT DOCUMENTS

EP 1 335 166 A2 8/2003
EP 2 056 032 A1 5/2009
(Continued)

OTHER PUBLICATIONS

European Search Report issued in application No. 14177952.0 dated Nov. 21, 2014.

*Primary Examiner* — Carlos R Ortiz Rodriguez
(74) *Attorney, Agent, or Firm* — KED & Associates, LLP

(57) ABSTRACT

An artificial intelligence air conditioner system and a method of controlling an air conditioner system are disclosed. The air conditioner system may include a plurality of air conditioner devices located or installed at a plurality of air conditioner sites in a decentralized fashion. A control setting having at least one of the plurality of air conditioner devices as a control device may be created irrespective of an installation position and a connection state of each air conditioner device, such that the control setting is immediately applied, or application of the control setting is released through simple manipulation, thereby providing an easy and rapid monitoring and controlling operation of the air conditioner system in a remote fashion.

16 Claims, 37 Drawing Sheets

(51) Int. Cl.
   *F24F 11/58*   (2018.01)
   *F24F 11/52*   (2018.01)

(56) References Cited

U.S. PATENT DOCUMENTS

2004/0204793 A1* 10/2004 Yoon .................. G05D 23/1905
                                                    700/277
2009/0187499 A1*  7/2009 Mulder .................. G05B 15/02
                                                    705/30

FOREIGN PATENT DOCUMENTS

| EP | 2 093 510 A1 | 8/2009 |
| EP | 2 455 677 A1 | 5/2012 |

\* cited by examiner

ARTIFICIAL INTELLIGENCE AIR CONDITIONER SYSTEM AND METHOD OF CONTROLLING AN AIR CONDITIONER SYSTEM

CROSS-REFERENCE TO RELATED APPLICATION(S)

This application claims priority to Korean Patent Application No. 10-2013-0086303, filed on Jul. 22, 2013 in the Korean Intellectual Property Office, the disclosure of which is incorporated herein by reference.

BACKGROUND

1. Field

An air conditioner system and a method of controlling an air conditioner system are disclosed herein.

2. Background

An air conditioner is installed to discharge hot air or cool air into a room, thereby creating a comfortable indoor environment, adjusting a temperature of the room, and purifying air in the room. In general, the air conditioner may include an indoor unit or device, constituted by a heat exchanger, installed in the room and an outdoor unit or device, constituted by a compressor and a heat exchanger, to supply refrigerant to the indoor unit.

In the air conditioner, the indoor unit constituted by the heat exchanger and the outdoor unit constituted by the compressor and the heat exchanger may be separately controlled. The supply of electric power to the compressor or the heat exchanger may be controlled to operate the air conditioner. In addition, the air conditioner may be configured such that at least one indoor unit is connected to a single outdoor unit. According to a requested operation state, refrigerant may be supplied to the indoor unit such that the air conditioner is operated in a cooling mode or in a heating mode.

The air conditioner may perform a cooling operation or a heating operation based on flow of the refrigerant. During the cooling operation, high-temperature, high-pressure liquid refrigerant may be supplied from the compressor of the outdoor unit to the indoor unit via the heat exchanger of the outdoor unit. The high-temperature, high-pressure liquid refrigerant may be expanded by the heat exchanger of the indoor unit. As a result, the refrigerant may be evaporated to lower the temperature of air around the heat exchanger of the indoor unit. An indoor unit fan may be rotated to discharge cool air into the room. During the heating operation, high-temperature, high-pressure gaseous refrigerant may be supplied from the compressor of the outdoor unit to the indoor unit. The high-temperature, high-pressure gaseous refrigerant may be liquefied by the heat exchanger of the indoor unit. Air heated by energy emitted from the refrigerant may be discharged into the room according to operation of the indoor unit fan.

In a case in which a plurality of indoor units is connected to a single outdoor unit, in a case in which a plurality of outdoor units is connected to each other, in a case in which a plurality of units, such as a ventilation unit or device and a heat pump, is connected to each other, or in a case in which a plurality of air conditioner sites is connected to each other, the above-mentioned units may be integrally managed through an additional central control device.

Conventionally, the central control device groups a plurality of units or divides the units into predetermined zones, such that the central control device may control the units on a per group basis or on a per zone basis. However, formation and change of the groups or the zones and addition of a new group or a new zone may be performed by only the central control device, which is inconvenient.

In addition, a plurality of units may be controlled through access to the central control device using a terminal. However, a control range may be limited. Furthermore, an object to be controlled may be selected through a complex menu, which is troublesome and inconvenient.

BRIEF DESCRIPTION OF THE DRAWINGS

Embodiments will be described in detail with reference to the following drawings in which like reference numerals refer to like elements, and wherein.

The above and other objects, features and other advantages of the present invention will be more clearly understood from the following detailed description taken in conjunction with the accompanying drawings, in which.

DETAILED DESCRIPTION

Advantages and features and a method of achieving the same will be more clearly understood from embodiments described below with reference to the accompanying drawings. However, embodiments are not limited to the following embodiments, but may be implemented in various different forms. The embodiments are provided merely to complete disclosure. Wherever possible, the same reference numbers will be used throughout the specification to refer to the same or like elements.

Hereinafter, reference will now be made in detail to embodiments, examples of which are illustrated in the accompanying drawings.

Figure 1:
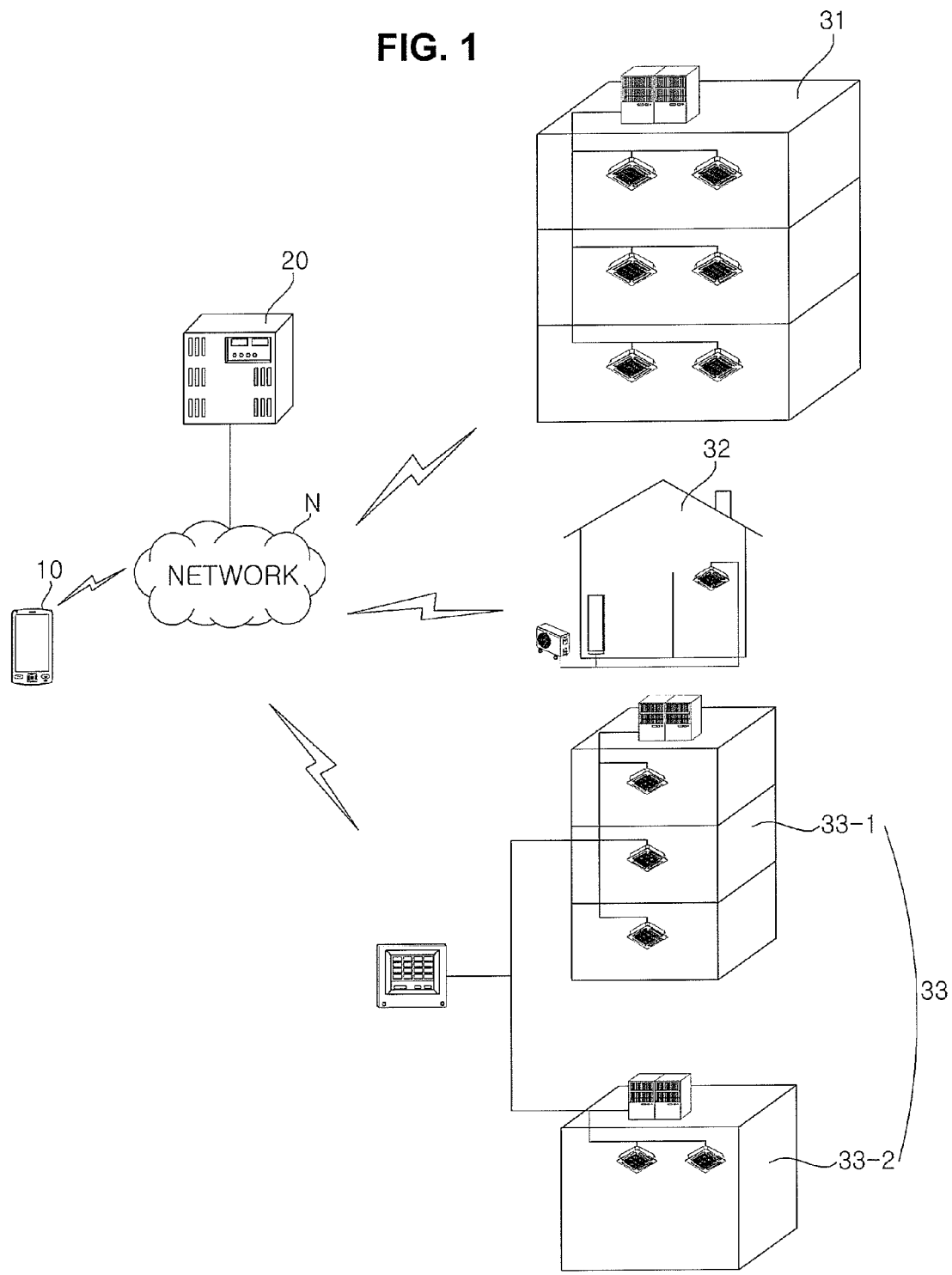
FIG. 1 is a schematic view of an air conditioner system according to an embodiment.

FIG. 1 is a schematic view of an air conditioner system according to an embodiment. As shown in FIG. 1, the air conditioner system may include a plurality of air conditioner sites 31, 32, and 33, at each of which may be provided at least one unit or device including an outdoor unit or device (not shown) and an indoor unit (not shown), a server 20 connected to the air conditioner sites 31, 32, and 33 over a predetermined network N, and a terminal 10 to access the plurality of air conditioner sites 31, 32, and 33 and the server 20 over the network N.

Each of the plurality of air conditioner sites 31, 32, and 33 may include at least one unit or device to constitute an air conditioner network in or at each of the plurality of air conditioner sites 31, 32, and 33. In addition, the plurality of air conditioner sites 31, 32, and 33 may be connected to one another to constitute another air conditioner network.

Each of the plurality of air conditioner sites 31, 32, and 33 may include a controller to control and monitor operation of each unit in or at each of the plurality of air conditioner sites 31, 32, and 33. Each of the plurality of air conditioner sites 31, 32, and 33 may transmit data regarding an operation state of each unit in each of the plurality of air conditioner sites 31, 32, and 33 to the server 20 and the terminal 10 over the network N, and in addition, variably control the operation of each unit in each of the plurality of air conditioner sites 31, 32, and 33 according to a control signal received from the server 20 or the terminal 10.

Thus, a plurality of air conditioner units or devices may be located or installed at the plurality of the air conditioner sites 31, 32, and 22 in a decentralized fashion, but still be accessed and controlled by the terminal 10 over the network N. Further, as discussed hereinbelow, the terminal 10 may set or designate one of the plurality of air conditioner units or devices or a group thereof as a control device(s) or device(s) to be controlled.

Each of the plurality of air conditioner sites 31, 32, and 33 may further include a ventilation unit or device, an air purification unit or device, a humidification unit or device, a dehumidification unit or device, or a heater in addition to the outdoor unit and the indoor unit. The plurality of air conditioner sites 31, 32, and 33 may include different types and numbers of units.

The network N may include network access, such as the Internet, in addition to the air conditioner network. Both wired and wireless communication modes may be used.

The server 20 may store basic data regarding the plurality of air conditioner sites 31, 32, and 33 and data regarding operation states received from the plurality of air conditioner sites 31, 32, and 33. The basis data may include a number, types, and capacities of units constituting each of the plurality of air conditioner sites 31, 32, and 33 and address information for data transmission and reception. The operation state data may be updated at predetermined time intervals.

The server 20 may authorize the terminal 10, which may control each unit of each of the plurality of air conditioner sites 31, 32, and 33, to register the terminal and to control each unit of each of the plurality of air conditioner sites 31, 32, and 33. In addition, the server 20 may authenticate access to the terminal 10, and when operation of each unit of each of the plurality of air conditioner sites is changed according to control of the terminal 10, may store data regarding the changed operation of each unit of each of the plurality of air conditioner sites. In addition, the server 20 may provide a program necessary for the terminal 10 to access each of the plurality of air conditioner sites 31, 32, and 33 and each unit of each of the plurality of air conditioner sites 31, 32, and 33 and manage update of the program.

The terminal 10 may access the server 20 using a program installed therein over the network N to register the terminal 10 and may be given an authority to access each unit of each of the plurality of air conditioner sites 31, 32, and 33 such that the terminal 10 accesses at least one air conditioner site to control operation of at least one unit of the at least one air conditioner site. The terminal 10 may group the units included in the air conditioner sites based on types and positions of the units to control and monitor operation of the grouped units. In addition, the terminal 10 may not only group a plurality of units included in or at each air conditioner site to control operation of the grouped units, but also may group a plurality of units included in different two or more air conditioner sites to control operation of the grouped units.

Figure 2:
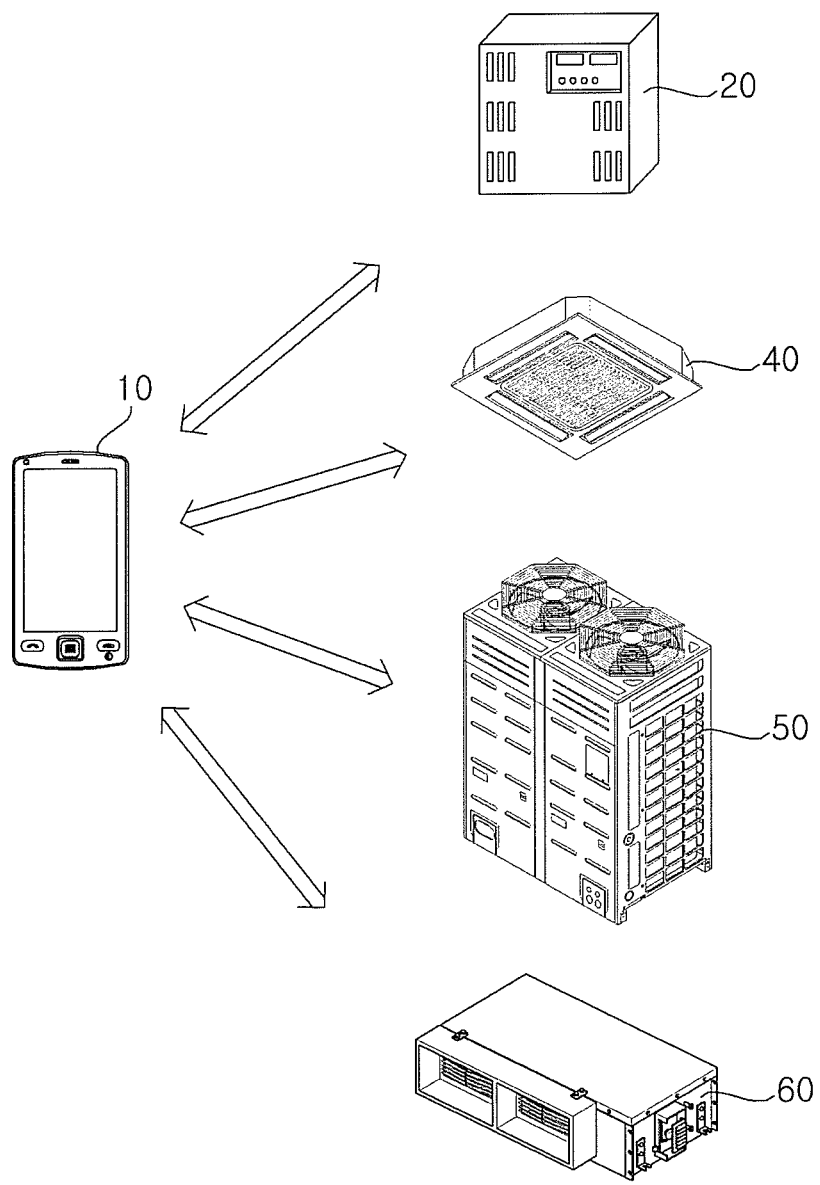
FIG. 2 is a view showing a communication flow of the air conditioner system according to an embodiment using a terminal.

FIG. 2 is a view showing a communication flow of the air conditioner system according to an embodiment using a terminal. Referring to FIG. 2, the terminal 10 may control operation of each unit of the air conditioner system and a plurality of units included in or at each of the air conditioner sites based on types and forms of the units.

The terminal 10 may access the server 20 to transmit and receive data to and from the server 20. In addition, the terminal 10 may control an outdoor unit or device 50, an indoor unit or device 40, and a ventilation unit or device 60. In addition, the terminal 10 may monitor and control operation of other units, such as a heat pump, a heater, an air purification unit or device, a humidification unit or device, and a dehumidification unit or device, included in each of the air conditioner sites.

Of the units included in or at each of the air conditioner sites, the indoor unit 40 may include an expansion valve (not shown) to expand refrigerant received from the outdoor unit 50 connected to the indoor unit 40, an indoor heat exchanger to perform heat exchange between the refrigerant and air, an indoor unit or device fan (not shown) to supply indoor air to the indoor heat exchanger and to discharge heat-exchanged air into a room, a plurality of sensors (not shown), and a controller (not shown) to control operation of the indoor unit 40. The indoor unit 40 may further include a discharge port, through which the heat-exchanged air may be discharged. In the discharge port may be provided an air direction adjustment device to open and close the discharge port and to adjust a direction of discharged air. The indoor unit 40 may control a rotational speed of the indoor unit fan to control an amount of suctioned air and discharged air, thereby adjusting air volume. In addition, the indoor unit 40 may further include a human body sensor to sense a human body present in the room according to circumstances. Further, the indoor unit 40 may include an output unit or output to display an operation state and setting information of the indoor unit 40 and an input unit or input to input setting data.

In addition, the outdoor unit 50 may operate in a cooling mode or a heating mode in response to a request of the indoor unit 40 connected to the outdoor unit 50 or a control command from an external device. The outdoor unit 50 may supply refrigerant to a plurality of indoor units. The outdoor unit 50 may include at least one compressor (not shown) to compress refrigerant introduced into the compressor and to discharge high-pressure gaseous refrigerant, an accumulator (not shown) to separate the refrigerant into gaseous refrigerant and liquid refrigerant, such that unevaporated liquid refrigerant may be prevented from being introduced into the compressor, an oil separator to collect oil from the refrigerant discharged from the compressor, an outdoor heat exchanger (not shown) to condense or evaporate the refrigerant through heat exchange between the refrigerant and outdoor air, an outdoor unit or device fan (not shown) to supply air to the outdoor heat exchanger and to discharge heat-exchanged air to the outside, such that heat exchange performed by the outdoor heat exchanger may be more smoothly achieved, a four-way valve (not shown) to change a refrigerant flow channel according to an operation mode of the outdoor unit 50, at least one pressure sensor (not shown) to measure pressure, at least one temperature sensor (not shown) to measure temperature, and a controller to control operation of the outdoor unit 50 and to perform communication with another unit. In addition, the outdoor unit 50 may further include a plurality of sensors, a valve, and an overcooling device, descriptions of which have been omitted.

Figure 3:
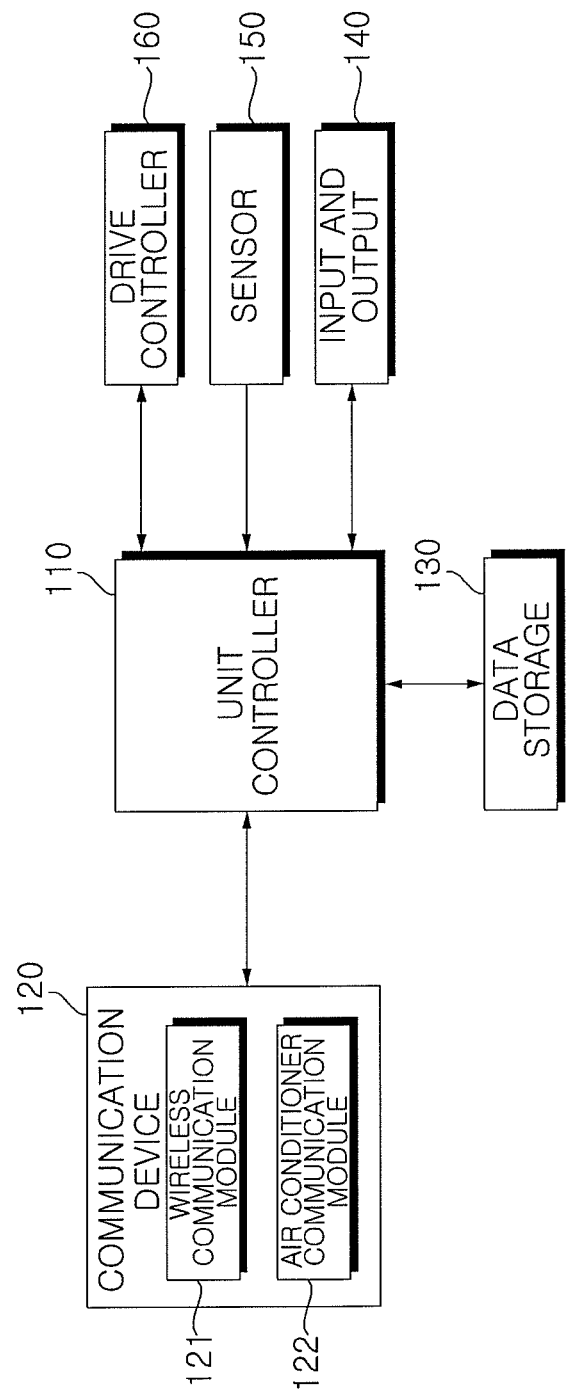
FIG. 3 is a block diagram of each unit or device of an air conditioner system according to an embodiment.

FIG. 3 is a block diagram of each unit or device of an air conditioner system according to an embodiment. Components of each unit of the air conditioner system may be commonly applied to other units of the air conditioner system. Some of the components of each unit of the air conditioner system may be added or omitted based on type and form of the unit.

Referring to FIG. 3, each unit of the air conditioner system may include a communication device 120, a data storage 130, a drive controller 160, a sensor 150, an input and output 140, and a unit or device controller 110 to control overall operation of the unit or device.

The communication device 120 may transmit data regarding operation and an operation state of the unit to a controller in the air conditioner site, transmit the data regarding the operation and the operation state of the unit to the server or the terminal over a predetermined network, and transmit a control signal received from the controller, the terminal, or the server to the unit controller 110. The communication device 120 may include a wireless communication module 121 to communicate with the server 20 or the terminal 10 over the network N and an air conditioner communication module 122 to communicate with another unit or controller in or at the air conditioner site. The communication device 120 may perform communication in a wired or wireless communication mode. The communication device 120 may include a plurality of communication modules based on the communication mode.

The drive controller 160 may control operation of the unit according to a control command from the unit controller 110. The drive controller 160 may have different constructions based on a type of the unit. For example, a drive controller of the outdoor unit may control operation of the compressor, the valve, and the outdoor unit fan. In this case, the drive controller 160 may include a compressor drive controller, a valve drive controller, and a fan drive controller. The drive controller of the indoor unit may control operation of the indoor unit fan.

The sensor 150 may include a plurality of sensors to measure data, such as temperature, pressure, rotational speed, voltage, and current. The sensor 150 may measure information regarding the unit inside or outside the unit through the sensors and input the measured information to the unit controller 110. In addition, the sensor 150 may further include a sensor to sense a human body present in the room according to the position at which the unit is installed.

The input and output 140 may control data input into and data output from the unit. The input and output 140 may input a predetermined signal to the unit controller 110 according to manipulation of at least one button or a predetermined input and display predetermined data on an output according to a control command from the unit controller 110. In this case, the input or the output may not be provided based on the type and form of the unit.

The data storage 130 may store basic data of the unit, control data to control operation of the unit, input and output data, and data received through the communication part 120.

The unit controller 110 may control input and output data to be processed, the unit to communicate with the terminal or the server through the communication device, and the unit to perform a predetermined operation according to a setting. The unit controller 110 may control the unit based on data measured or sensed by the sensor 150 and determine whether the unit operates normally or not.

The unit controller 110 may control the unit to operate according to an input operation setting or a control signal from the controller of the air conditioner site including the unit, provide data regarding the unit according to a request from the server 20 or the terminal 10, and control operation of the unit according to a received control signal.

Figure 4:
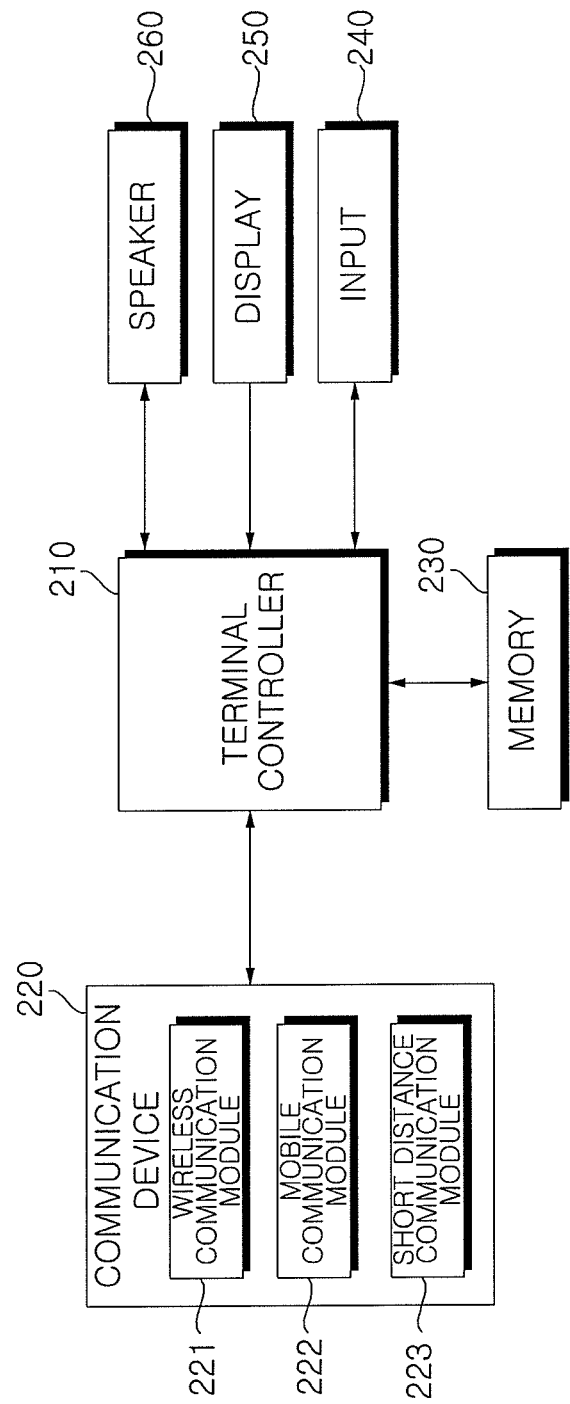
FIG. 4 is a block diagram of a terminal to control each unit or device of the air conditioner system according to an embodiment.

FIG. 4 is a block diagram of a terminal to control each unit or device of an air conditioner system according to an embodiment. Referring to FIG. 4, the terminal 10 may include a communication device 220, a speaker 260, a display 250, an input 240, a memory 230, and a terminal controller 210 to control overall operation of the terminal 10. In addition, the terminal 10 may further include a sensor, such as a position information sensor or an acceleration sensor, based on the form of the terminal, a description of which has been omitted.

The input 240 may include at least one button or a touch input device. According to circumstances, the input 240 may include both the button and the touch input device. The input 240 may transmit a user command input according to manipulation of the input to the terminal controller 210.

The display 250 may include a predetermined display to output numbers, letters, special characters, or images, for example. Alternatively, the display 250 may include a lamp lit or blinked to output an operation state of the terminal, a connection state between the terminal and each instrument, or an alarm.

The display 250 may output a user command input through the input 240 on a screen or output a predetermined screen corresponding to the input user command to display information regarding operation setting, operation state, and normality or abnormality of each unit of each of the air conditioner sites.

The speaker 260 may output a predetermined effect sound or alarm sound. The predetermined effect sound or alarm sound may be output under a specific condition, such as when operation starts, when the operation ends, when abnormality occurs, or when a user input is received, for example.

The memory 230 may store setting data input through the input 240, control data necessary to control operation of the terminal, data of each unit of each of the air conditioner sites received through the communication part 220, and data received from the server 20, for example. In addition, the memory 230 may store an application that accesses the server or the unit to monitor or control operation of the server or the unit. The application may be downloaded from the server or another application server.

The communication device 220 may include a plurality of communication modules to transmit and receive data in a wired or wireless communication mode. For example, the communication device 220 may include a wireless communication module 221, a mobile communication module 222, and a short distance communication module 223.

The terminal 10 may communicate with the server 20 and each unit of each of the air conditioner sites over the network N using the wireless communication module 221. In addition, the terminal 10 may access a mobile communication network through the mobile communication module 222 based on the type of the terminal 10 to use a voice service, as well as transmission and reception of data. The short distance communication module 223 may transmit and receive data within a predetermined distance using a communication mode, such as Bluetooth, ZigBee, infrared communication, or near field communication (NFC).

The terminal controller 210 may control data transmitted and received through the communication device 220 to be stored in the memory 230 and control input and output of the data. The terminal controller 210 may control operation of the terminal according to data input through the communication device 220 or the input 240 or control operation setting of the unit to be changed through an application.

The terminal controller 210 may display a menu screen to input a user command on the display 250, transmit data to the server or the unit through the communication part 220 according to input setting of the input 240, and receive data from the server or the unit.

The terminal controller 210 may execute the application stored in the memory 230 and access the server through the application to register the terminal. In addition, the terminal controller 210 may access each of the air conditioner sites through the application to receive and monitor information regarding each unit of each of the air conditioner sites. Alternatively, the terminal controller 210 may group the units to control operation of the grouped units.

In this case, the terminal controller 210 may transmit control commands to the respective communication modules of the communication device 220 to transmit and receive data to and from different communication objects in different communication modes. For example, in a case in which the terminal controller 210 accesses the server or the unit through the application, the terminal controller 210 may perform access through the wireless communication module 221. In a case in which the terminal controller 210 accessing the server or the unit through the wireless communication module 221 is not possible, the terminal controller 210 may perform access through the mobile communication module 222. In a case in which an electric home appliance or the unit is within a short distance from the terminal, the terminal controller 210 may communicate with the electric home appliance or the unit through the short distance communication module 223.

Upon accessing the server 20 or the unit, the terminal controller 210 may perform a predetermined authentication procedure according to a request from the server or the unit. The terminal controller 210 may transmit a unique identification number, such as identification (ID) and password, registered with the server to authenticate the terminal or may authenticate that the terminal has been registered through an additional authentication program.

Upon accessing the server or the unit, the terminal controller 210 may display screens different per ID on the display 250 according to authority given by the server.

FIGS. 5 to 12F are views illustrating various embodiments of controlling a plurality of units constituting a plurality of air conditioners using a terminal in an air conditioner system according to embodiments.

Figure 5A:
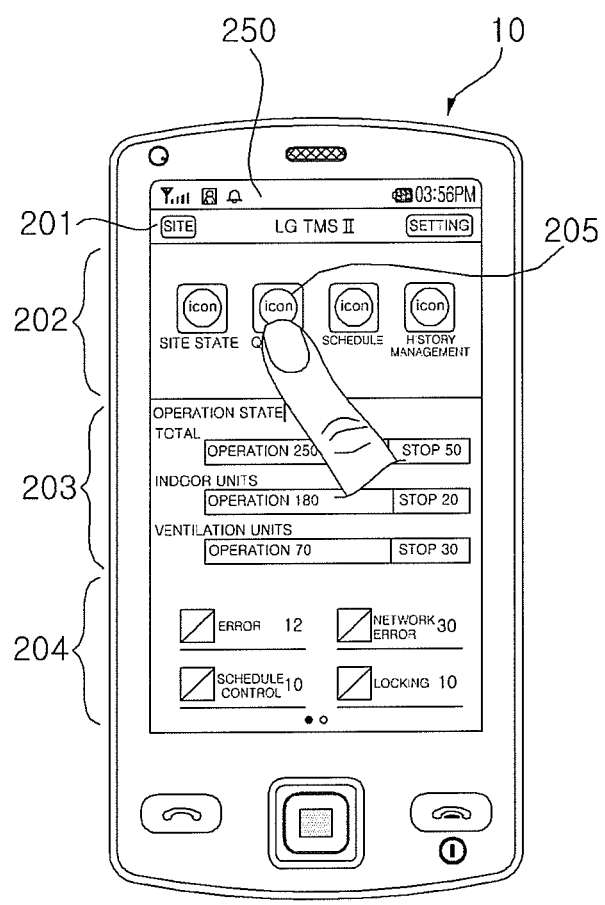
FIGS. 5A to 12F are views illustrating various embodiments of controlling a plurality of units or devices constituting a plurality of air conditioners using a terminal in an air conditioner system according to an embodiment.
Figure 5B:
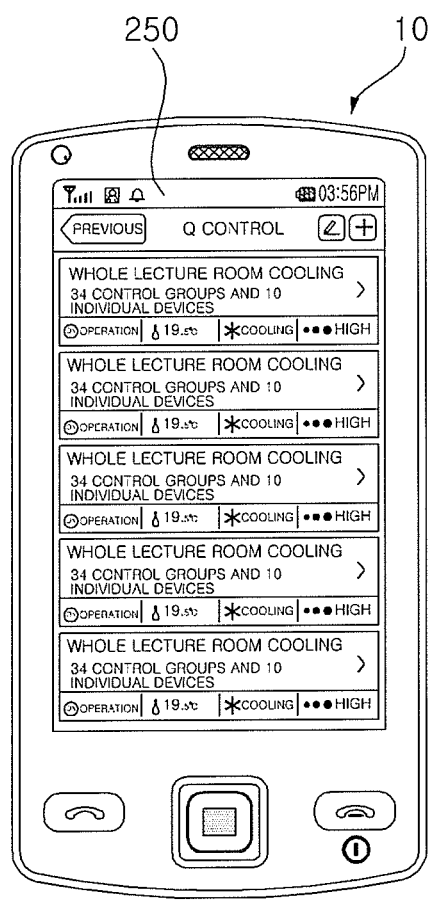

FIGS. 5A-5B are views illustrating construction of a control screen of a terminal to control air conditioner sites and units of the air conditioner sites according to embodiments. As shown in FIG. 5A, a menu screen to monitor and control a plurality of units constituting an air conditioner site may be displayed on the display 250 of the terminal 10.

Control items 202 for the air conditioner site or the units may be displayed on a main menu screen as icons or text. An operation state 203 and operation information 204 of the accessed air conditioner site may also be displayed on the main menu screen.

In addition, a site key 201 as a menu key to select a specific site from among a plurality of air conditioner sites may be displayed at one side of the screen. A setting key for application or control setting may be displayed. In addition, information, such as intensity of a signal, notification setting, battery capacity, and time, in connection with operation of the current terminal may be displayed at one side of the screen.

The control items 202 displayed on the main menu screen may include site state, Q control 205, schedule, and history management buttons, for example. When the site state button is selected, it is possible to monitor an overall operation state of each unit of the air conditioner site. When the schedule button is selected, it is possible to set schedules for the units and to change predetermined schedules. When the history management button is selected, it is possible to confirm a control history and a history based on the change in operation of the air conditioner site.

When the Q control button 205 is selected on the main menu screen, a predetermined Q control list is output to the screen of the display 250, as shown in FIG. 5B. The Q control may be provided to input and apply control setting within a short time. More specifically, the Q control may be provided to set a predetermined control pattern or control profile including a unit to be controlled and a control command for the unit. The Q control list may include Q control items for which the Q control may be set.

The Q control list may include Q control titles, the number of units or groups to be controlled, and an operation state, which may be simply displayed. For example, whether operation is being performed or is stopped may be displayed as text or an icon. In addition, information regarding a control temperature, operation modes, and air volume, may be displayed.

In a case in which one item is selected from the Q control list in a state in which the Q control list is displayed, detailed information of the item selected from the Q control list may be displayed. Alternatively, in a case in which an arrow located at a right end of each item is selected, the detailed information of the selected item may be displayed.

FIG. 6 is a view illustrating a detailed screen of the terminal Q control item.

Figure 6A:
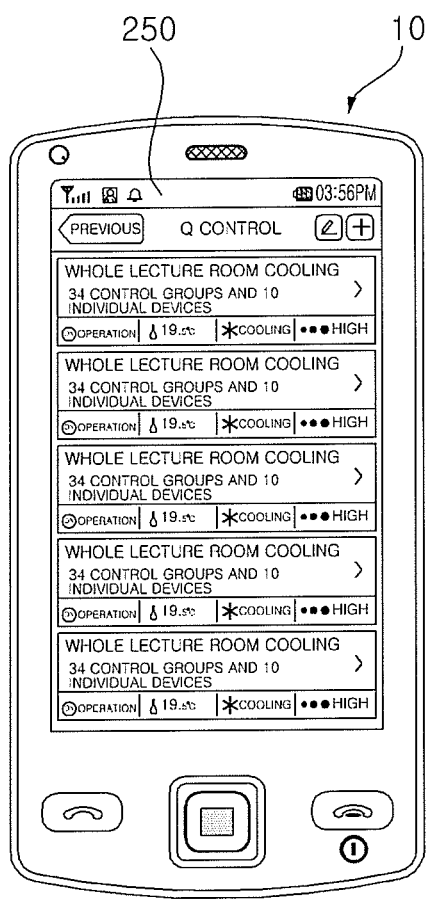
Figure 6B:
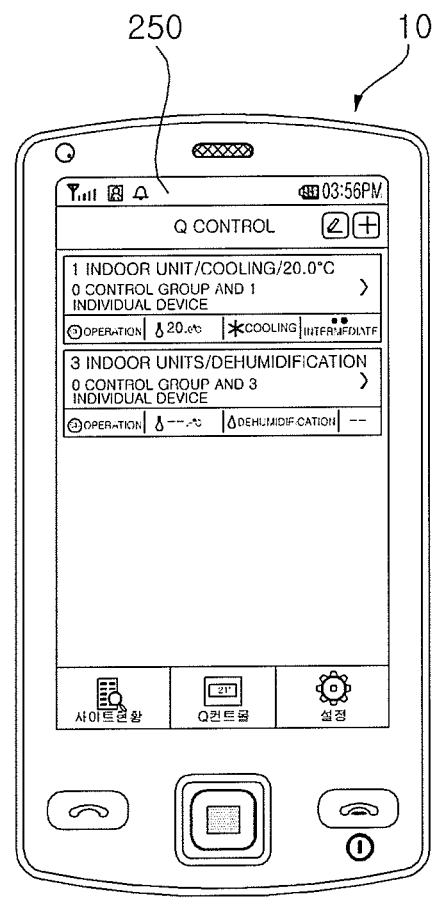

When Q control is selected on the main menu screen as shown in FIG. 6A, a predetermined Q control list may be displayed. Items of the Q control list may be differently controlled. The items of the Q control list may be added or deleted. Alternatively, setting of the items of the Q control list may be changed. A key provided at an upper end of the Q control list may be selected to edit the Q control list. In a case in which the Q control list, which may include a plurality of Q control items, is not fully displayed on one page, the screen may be dragged upward or downward to display the rest of the Q control list on the screen as shown in FIG. 6B.

According to circumstances, in a case in which the screen is dragged to the left or to the right, the Q control list on the next page may be displayed. In addition, in a case in which the Q control list is not fully displayed on one page, an additional scroll bar may be displayed at one side of the screen.

Figure 6C:
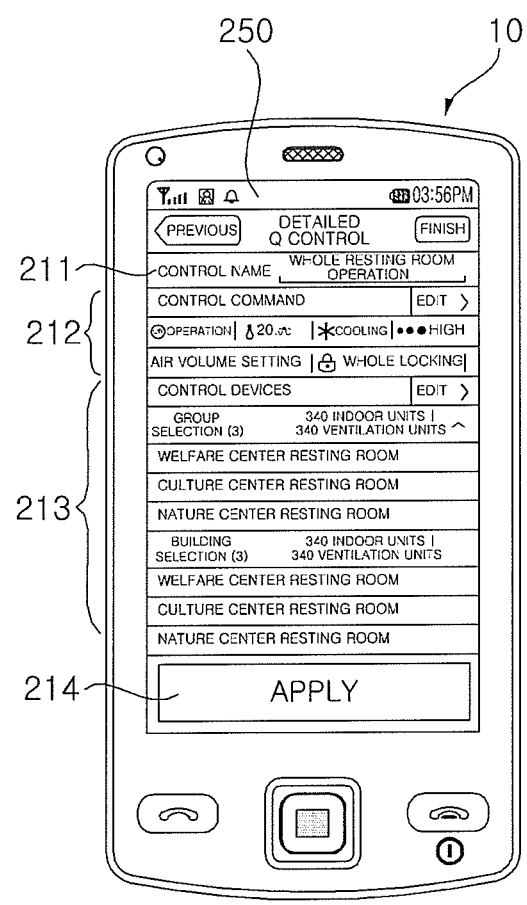

When any one item is selected from the Q control list displayed on the screen of the display 250, detailed information regarding the selected item may be displayed as shown in FIG. 6C. In connection with the Q control, a control name 211 of the Q control, a set control command 212, and a control device 213 to be controlled may be displayed as detailed information. The control command and the control device as well as the control name may be changed through editing. When an apply key 214 is selected, the changed settings may be immediately applied.

In a case in which the Q control is changed, the terminal controller 210 may create a control signal based thereon and transmit the created control signal to the server or each air conditioner site or each unit to be changed through the communication device 220.

The control name 211 may be set according to a user input through the input 240. In a case in which there in no additional input, however, the control name 211 may be automatically set based on the type or position of the control device. Alternatively, the control name 211 may be automatically set according to default setting. For example, in a case in which all units of a resting room group are selected, the resting room may be input as the control name if there is no additional input. Alternatively, Q control N (N being an integer equal to or greater than 1) may be automatically input as the control name.

In the control command 212, whether an operation is being performed or not, temperature, operation modes, air volume, and whether locking is being performed or not may be displayed as letters, numbers, special characters, images, or emoticons, for example.

The control device 213 may be a device to be controlled. The control device 213 may be set based on a single unit, a group or groups set in the air conditioner site, the entirety of the air conditioner site, or a building in which some air conditioners may be installed. In connection with the control device 213, the types and quantities of the units included in each group or each building group may be displayed.

For example, the Q control setting having an all resting room operation as the control name may include a resting room of a welfare center, a resting room of a culture center, and a resting room of a nature center. More specifically, the Q control setting may include 340 indoor units and 340 ventilation units. In addition, the control devices of the Q control having operation of all of the resting rooms may be set to about 20° C. cooling and a high level of air volume. All locking may be applied to all units such that the setting cannot be changed by a remote controller.

The apply key 214 may be selected, and at the same time, a control signal may be transmitted to the included control devices to commence operation of the control devices.

Figure 6D:
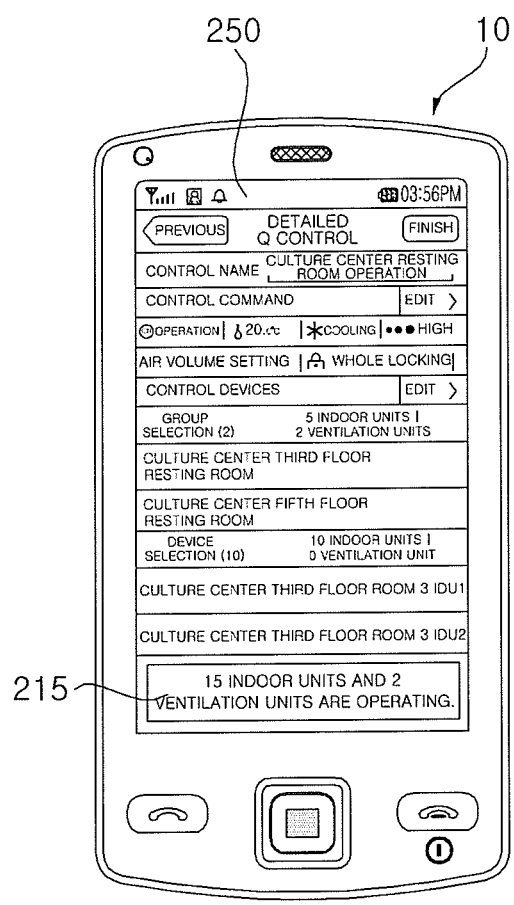

When a new Q control setting is finished or any one of the predetermined setting items is changed and then the apply key is input in the Q control setting, as shown in FIG. 6D, a guide message may be displayed on or at a lower end of the screen of the display part 250. For example, when control setting is finished and then the apply key is input in the Q control having operation of the resting rooms of the culture center as the control name, control devices of the resting rooms of the culture center, that is, 15 indoor units and 2 ventilation units installed in the resting rooms of third and fifth floors of the culture center, may start to operate, and a guide message indicating "15 indoor units and 2 ventilation units are operating" may be displayed.

When the apply key is input in FIG. 6C as previously described, a guide message indicating "340 indoor units and 340 ventilation units are operating" may be displayed. At this time, a guide voice or a predetermined effect sound may be output through the speaker 260 simultaneously when the guide message is displayed on the screen.

Figure 7A:
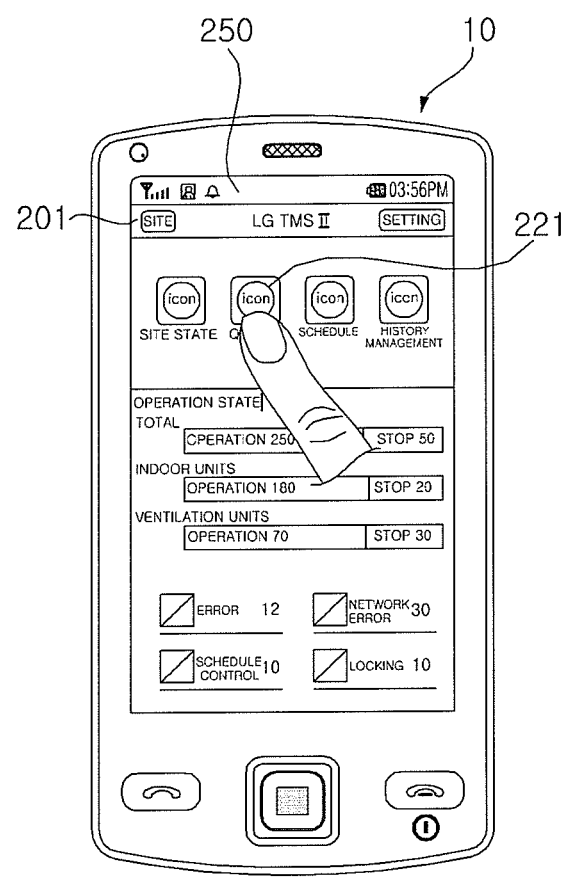
Figure 7B:
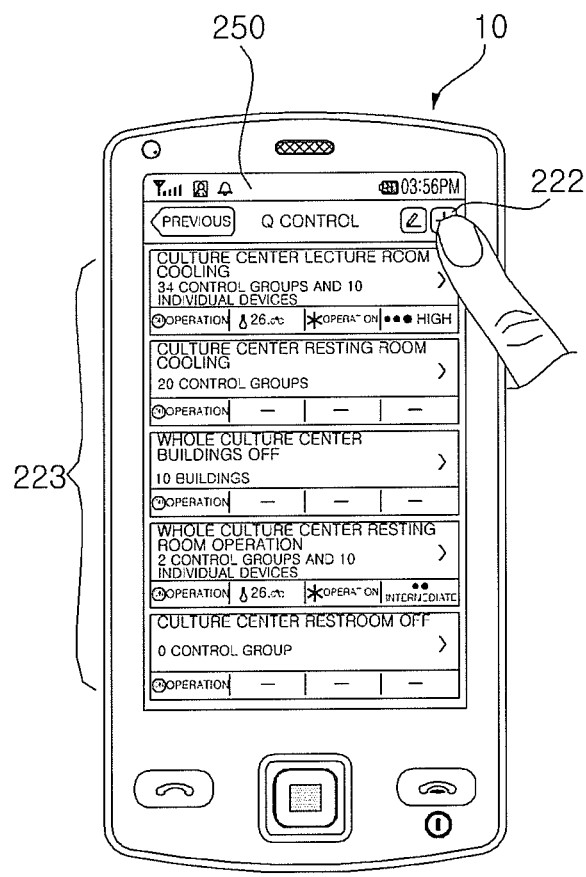

FIGS. 7A-7F and 8A-8C are reference views illustrating a Q control addition method performed by a terminal according to the embodiment. When a Q control key 221 is selected on the main control screen as shown in FIG. 7A, a Q control list may be displayed on the screen of the display 250, as shown in FIG. 7B. In the Q control list, setting information per control item may be simply displayed as at least one selected from among letters, numbers, images, emoticons, and special characters, for example. When an add key 222 positioned at an upper end of the screen is selected in a state in which a list including a plurality of control items is displayed, a new Q control may be set.

Figure 7C:
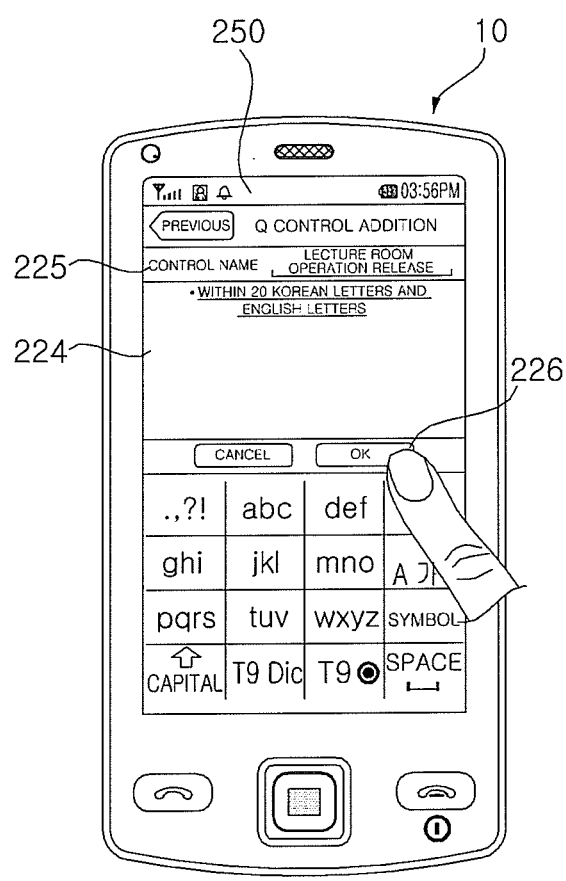

As shown in FIG. 7C, a setting screen to add the new Q control may be displayed on the display 250. A control name 225 for the Q control to be controlled may be input and an additional description thereof may be input to an input window 224. When an OK key 226 is selected, the control name may be set. When a cancel key is selected, on the other hand, the input control name may be canceled. As shown, Q control setting to release operation of a lecture room may be performed.

Figure 7D:
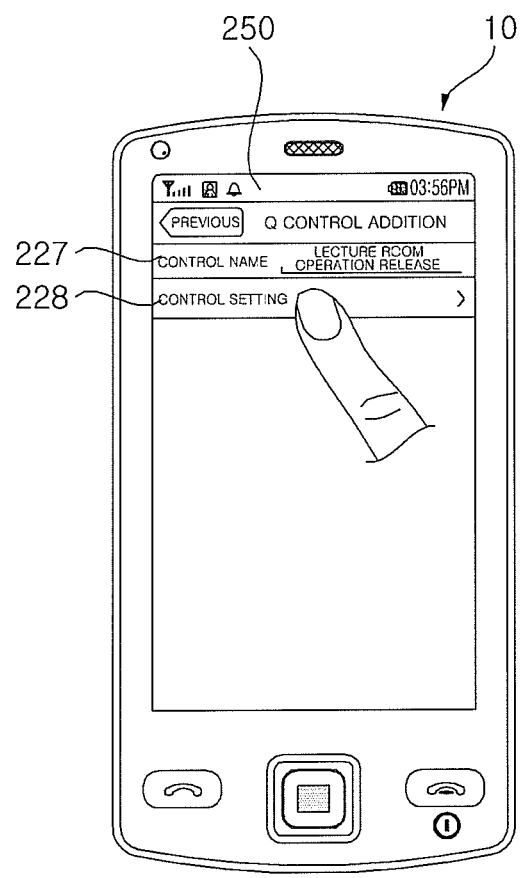
Figure 7E:
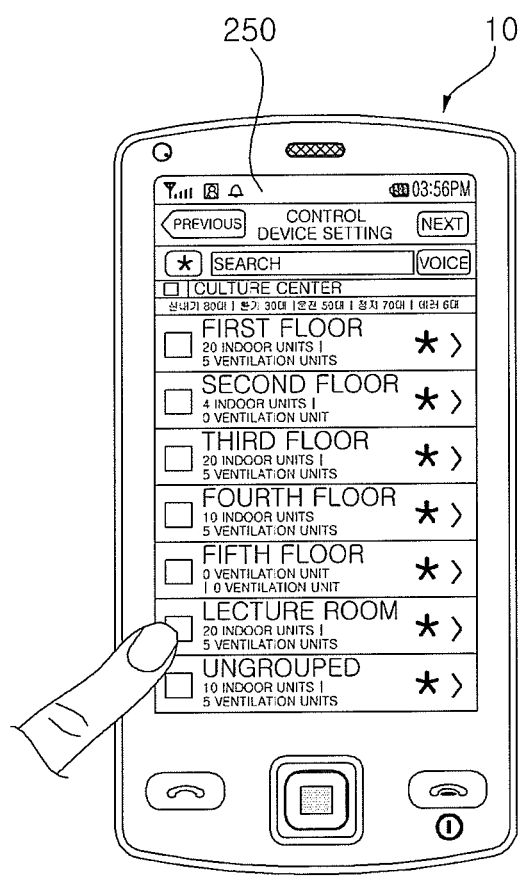
Figure 7F:
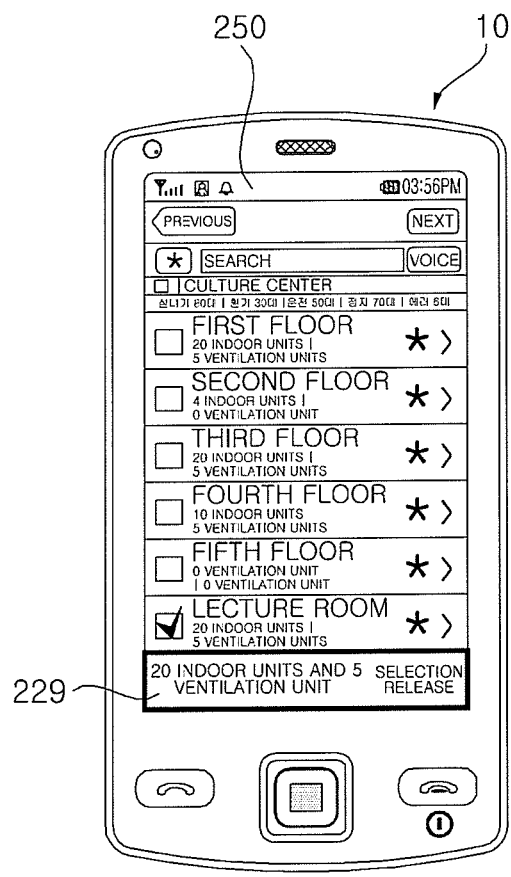

When the OK key 226 is input, a pre-input control name 227 indicating 'operation of the lecture room has been released' may be displayed on the screen and control setting 228 may be input, as shown in FIG. 7D. When the control setting part is selected, a list of control devices to be controlled may be output to the screen of the display 250, as shown in FIG. 7E.

At this time, information regarding the site in which the units are positioned or information regarding a specific region in the site may be displayed at an upper end of the screen. For example, the units displayed in the control device list may be units belonging to the culture center. The culture center may include 50 indoor units and 30 ventilation units. In addition, the number of the units of the culture center that are operating, the units of the culture center that are stopped, and the units of the culture center that are out of service may also be displayed.

A list of a plurality of units may be output. At this time, in the list, groups for the units may be displayed in a predetermined order and individual units that are not grouped may be displayed as ungrouped units. In addition, the types and numbers of the units belonging to the groups may be displayed together with the group names in the control device list. For example, a first floor group may include 20 indoor units and 5 ventilation units. In addition, it can be seen that 10 indoor units and 5 ventilation units are present as the ungrouped units.

In the control device list, a check box may be displayed at a left side of each group name or each unit name. When the check box is selected, a mark 'v' may be displayed and, in addition, a guide message 229 indicating that the corresponding group or unit has been selected may be displayed.

In addition, information regarding the selected group or unit may also be displayed at a lower end of the screen. For example, when a lecture room is selected, a check box of the lecture room may be selected, and a guide message 229 indicating that 20 indoor units and 5 ventilation units have been selected may be displayed at the lower end of the screen.

Figure 8A:
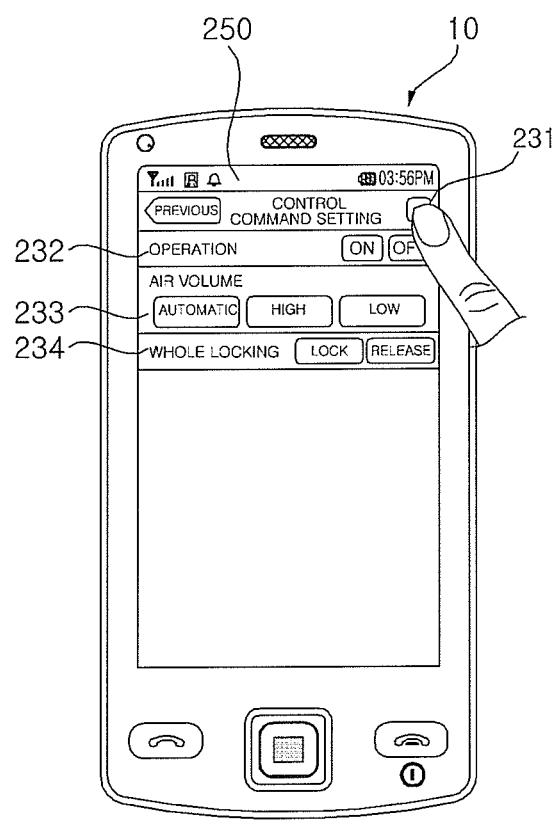

When the selection of the control devices is finished and a next key is selected on the screen, it is possible to set a control command for the selected control devices, as shown in FIG. 8A. Operation setting 232 to select operation ON/OFF, air volume setting 233, and all locking of selected control devices may be displayed on a control command setting screen. For example, operation OFF may be selected in the operation setting 232 as the Q control may be set to release operation of the lecture room. Any one may be selected from among automatic, high, and low in the air volume setting. When the all locking is selected, all of the selected control devices may be locked such that the setting of each unit cannot be changed by a remote controller.

Figure 8B:
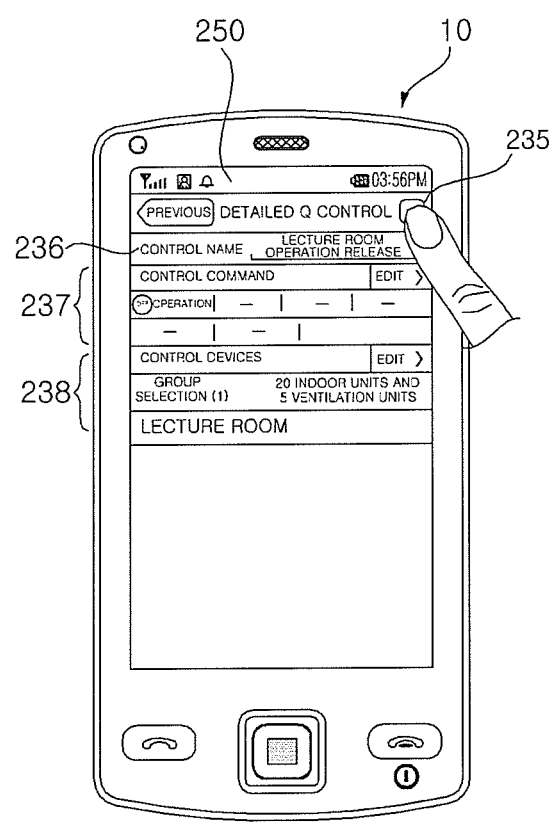

At this time, when a next key 231 provided at an upper end of the screen is selected, a pre-input Q control setting may be displayed on the screen as shown in FIG. 8B. As the Q control is a control to release operation of the lecture room, only information regarding operation OFF and information 238 regarding the selected control devices may be displayed in a control command 237. The control command 237 and the control devices may be changed through an edit key. A control name 236 may also be selected and changed.

Figure 8C:
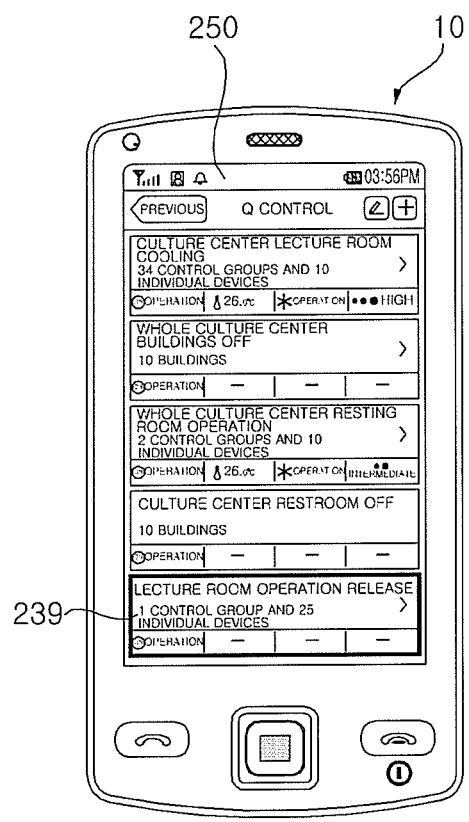

When a finish key 235 provided at an upper end of the screen is selected, a newly added Q control item 239 may be added to the Q control list and output to the screen of the display 250, as shown in FIG. 8C. The newly added item may be displayed using a color different than colors of the other items. The newly added item may be positioned at a lower end of the list.

Figure 9A:
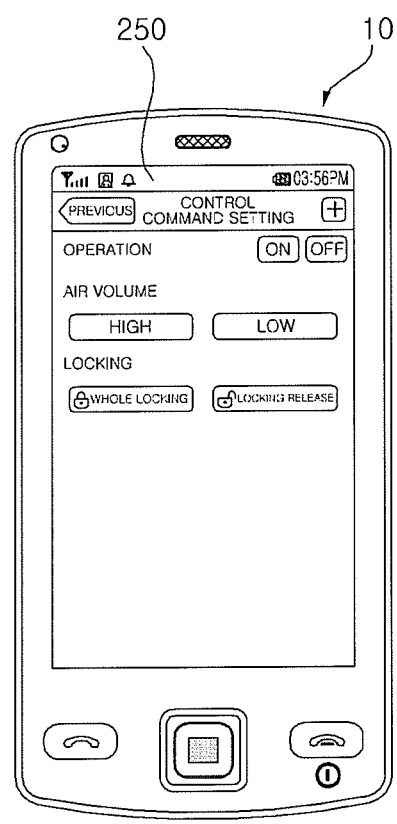

FIG. 9A-9D are views illustrating a control setting screen based on the types of control devices included in an air conditioner site. FIG. 9A shows that, in a case in which different types of units are set as the control devices, a control command setting screen may be displayed on the display 250.

In a case in which different types of units are set as the control devices, for example, in a case in which an indoor unit and a ventilation unit are set as the control devices, control commands common to the indoor unit and the ventilation unit may be set. In connection with the units included in the air conditioner site, control commands commonly applicable to the units may be operation ON/OFF setting, air volume, and locking setting, for example.

Figure 9B:
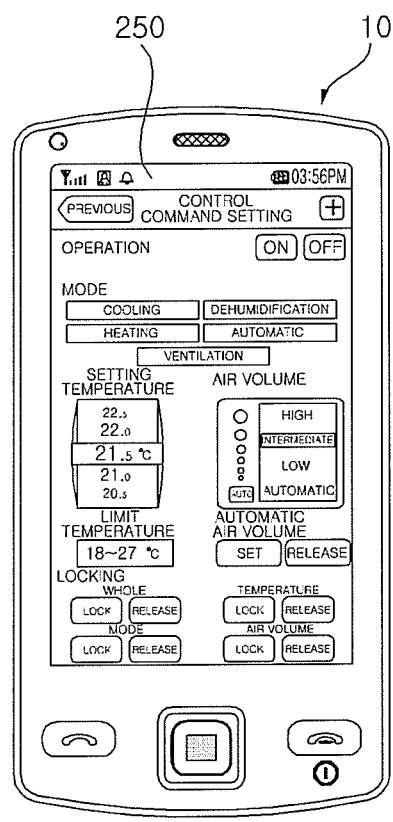

In a case in which only the indoor unit is set as the control device, control commands for the indoor unit may be set, as shown in FIG. 9B. In a case in which only the indoor unit is set as the control device, control commands in connection with operation of the indoor unit may be set. As the control commands for the indoor unit, operation setting, operation modes, a setting temperature, air volume, a limit temperature, automatic setting of air volume, and locking setting, for example, are possible.

In the operation setting, operation ON/OFF may be selected. In the operation mode, the indoor unit may be set to operate in any one mode selected from among cooling, dehumidification, heating, automatic, and ventilation, for example.

In addition, a setting temperature of the indoor unit may be selected. In connection therewith, an air volume may be set to any one selected from among high, intermediate, low, and automatic, for example. The automatic setting of the air volume may be set or released and a limit temperature may be set for a plurality of indoor units included in the control devices. The limit temperature may be set for both a minimum temperature and a maximum temperature. For example, in a case in which the minimum temperature is set to about 18° C. and a maximum temperature is set to about 27° C., the setting temperature cannot be set to lower than about 18° C. in the cooling mode and the setting temperature cannot be set to higher than about 27° C. in the heating mode.

In addition, the locking setting may be individually performed for a mode, temperature, and air volume in addition to all locking of all control devices (indoor units). That is, for all locking, a mode setting cannot be changed. In a case in which only mode is set to be locked, however, the mode cannot be changed but the temperature and the air volume may be individually controlled in the indoor units. In a case in which the temperature or the air volume is individually set to be locked, on the other hand, only the temperature or the air volume may be locked and thus, setting thereof cannot be changed. Other settings may be changed.

Figure 9C:
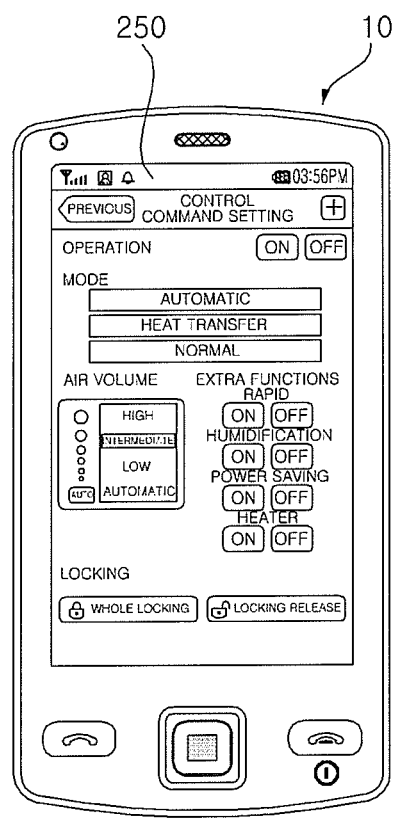

FIG. 9C is a view showing a control command setting screen of a ventilation unit. As shown in FIG. 9C, control commands for the ventilation unit may be set for operation setting, operation modes, air volume, extra functions, and locking setting, for example.

Selectable operation modes of the ventilation unit may include an automatic mode, a heat transfer mode, and a normal mode, for example. In addition, the air volume may be set to high, intermediate, low, and automatic, for example. In the locking setting, all locking and locking release are possible.

Figure 9D:
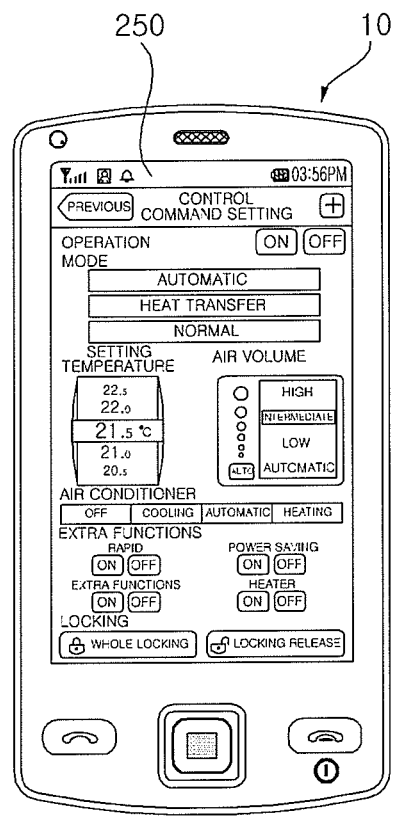

The extra functions of the settable control commands of the ventilation unit may include a rapid function, a humidification function, a power saving function, and a heater function, for example. Each function may be controlled ON/OFF. For a direct expansion type ventilation unit, as shown in FIG. 9D, operation setting, operation modes, setting temperature, air volume, an air conditioner function, extra functions, and locking setting functions, for example, may be provided in control commands.

The operation mode may be set to any one selected from among the automatic mode, the heat transfer mode, and the normal mode, and the setting temperature may be input as in the indoor unit, for example. In addition, the air volume may be set to any one selected from among high, intermediate, low, and automatic, for example.

The direct expansion type ventilation unit may have an air conditioner function unlike a general ventilation unit. Consequently, the direct expansion type ventilation unit may be set to any one selected from along air conditioner ON/OFF, cooling, automatic, and heating, for example. That is, the direct expansion type ventilation unit may have a combination of a ventilation function and a cooling and heating air conditioner function. Consequently, the direct expansion type ventilation unit may simultaneously provide the ventilation function and the cooling and heating function.

In addition, the extra functions may be set as in the ventilation unit. ON/OFF control setting is possible for a rapid mode, power saving, humidification, and a heater, for example. All locking may be set and released.

When the Q control is added as previously described with reference to FIGS. 7A-7F and 8A-8C, the control command setting screen may be differently displayed based on the types of the units set as the control devices as described above, and therefore, functions settable according thereto may be changed.

In a case in which different types of units are simultaneously set as the control devices, however, a control setting may be performed for the common functions as shown in FIG. 9A. In a case in which only the indoor unit is set as the control device, the control command setting screen may be displayed as shown in FIG. 9B. In a case in which only the ventilation unit is set as the control device, on the other hand, the control command setting screen may be displayed on the screen of the display 250, as shown in FIG. 9C.

Figure 10A:
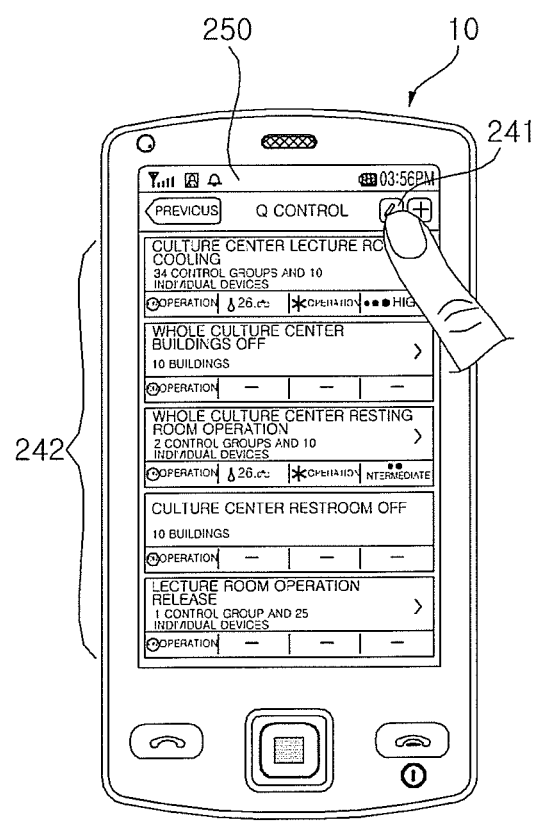
Figure 10B:
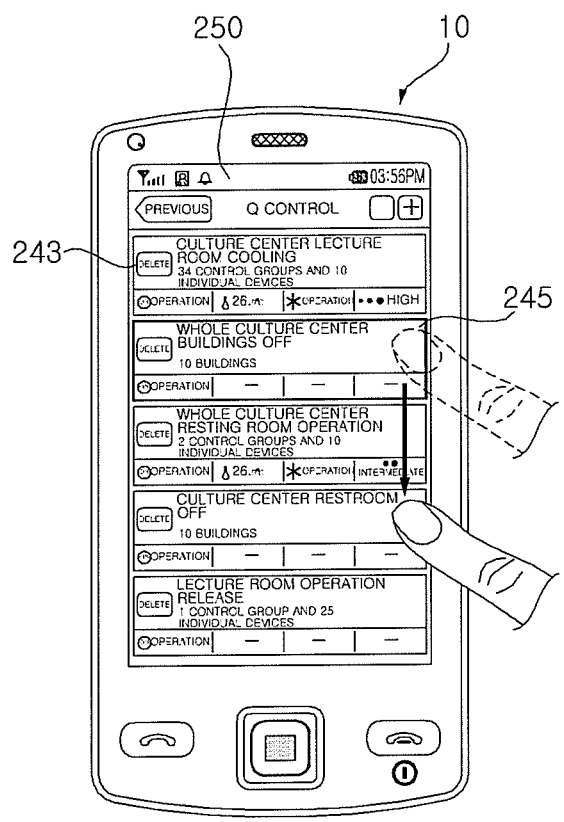
Figure 10C:
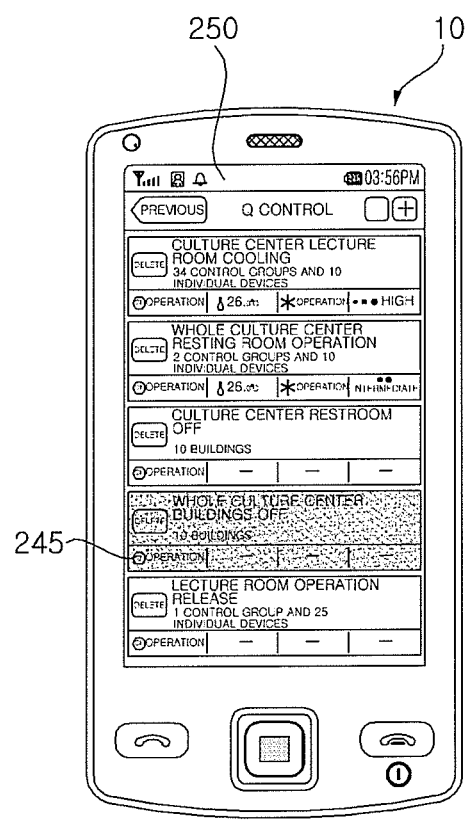

FIGS. 10A-10C are views illustrating a Q control list displayed on the display 250 of the terminal 10. As shown in FIG. 10A, the Q control list may be displayed on the screen of the display 250. A plurality of Q control items of the Q control list may be arranged and displayed in a predetermined order. Setting information per Q control item may be simply displayed.

When the number of the items of the Q control list is equal to or greater than a predetermined value, the Q control list may be displayed on one or more screens. In this case, the screen may be dragged or scrolled to display the last item of the Q control list.

When an edit key 241 is selected in a state in which the Q control list is displayed, an edit mode to change the Q control list may be displayed.

In a case in which any one of the control items of the Q control list displayed on the screen is selected and dragged in the edit mode, as shown in FIG. 10B, the selected control item may be moved in the dragged direction. For example, in a case in which a whole culture center building OFF item

245 is selected from the control items and is dragged downward, the whole culture center building OFF item 245 may move to a lower end of the list. The display position of the control item is changed to a position on or at which the dragging operation is stopped.

As shown in FIG. 10C, therefore, the whole culture center building OFF item 245, which was displayed under a culture center lecture room cooling item, may move to under a culture center restroom OFF item through editing of the list and may be displayed. In this way, the position of the items of the Q control list may be changed and displayed. That is, the position of frequently used Q control items may be changed to be positioned at an upper end of the control list.

Figure 11A:
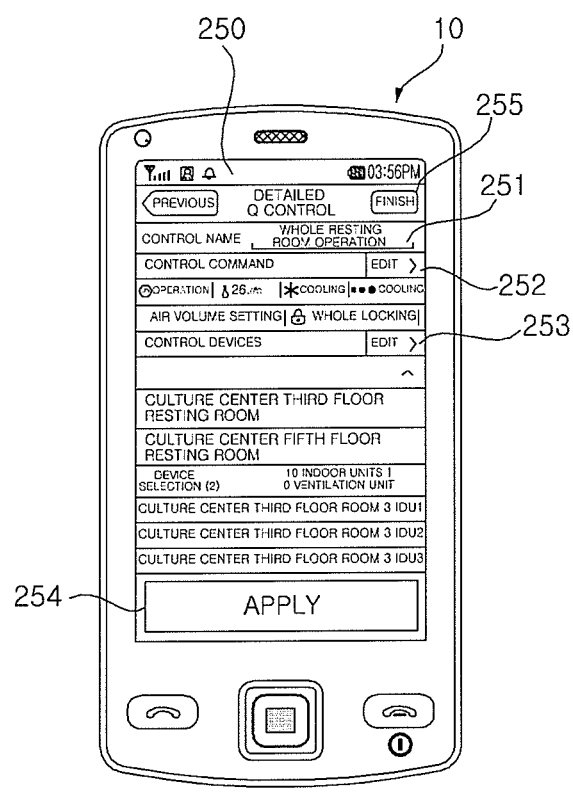

FIGS. 11A-11E are collectively a reference view illustrating an edit function of the Q control list. As previously described, the predetermined Q control may be changed through an edit menu. When edit keys 252 and 253 provided for corresponding items, such as a control command and a control device, are selected on a detailed Q control screen, as shown in FIG. 11A, setting of the respective items may be changed.

Figure 11B:
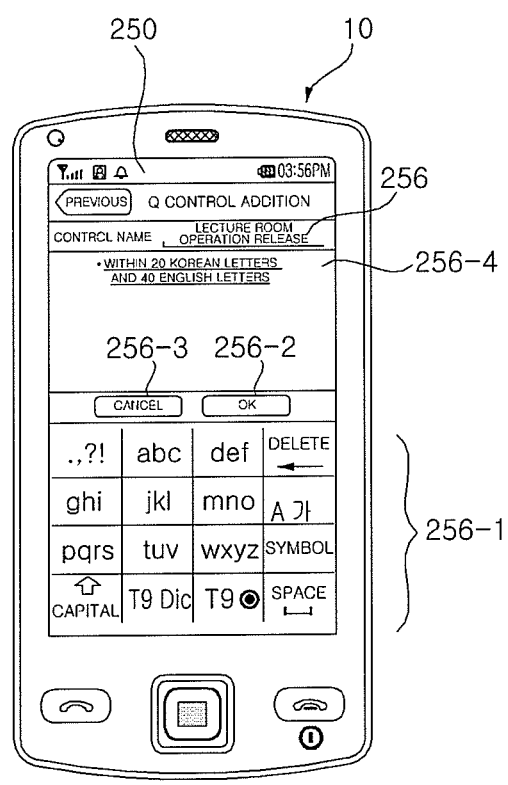

For a control name, an input control name 251 may be selected to switch to an edit mode to change the control name without an additional edit key. When the control name 251 is selected, an edit mode to change the control name may be displayed on the screen, as shown in FIG. 11B. At this time, a keyboard 256-1 may appear on or at one side of the edit mode screen.

In the control name edit mode, a currently set control name 256 may be displayed, and an input window 256-4 may be displayed under the control name 256 to input a new control name. A soft key of the keyboard 256-1 appearing on the screen may be selected to change the control name.

When the change of the control name is finished, an OK key 256-2 may be input. A cancel key 256-3 or a previous key may be selected to maintain the existing setting without change.

Figure 11C:
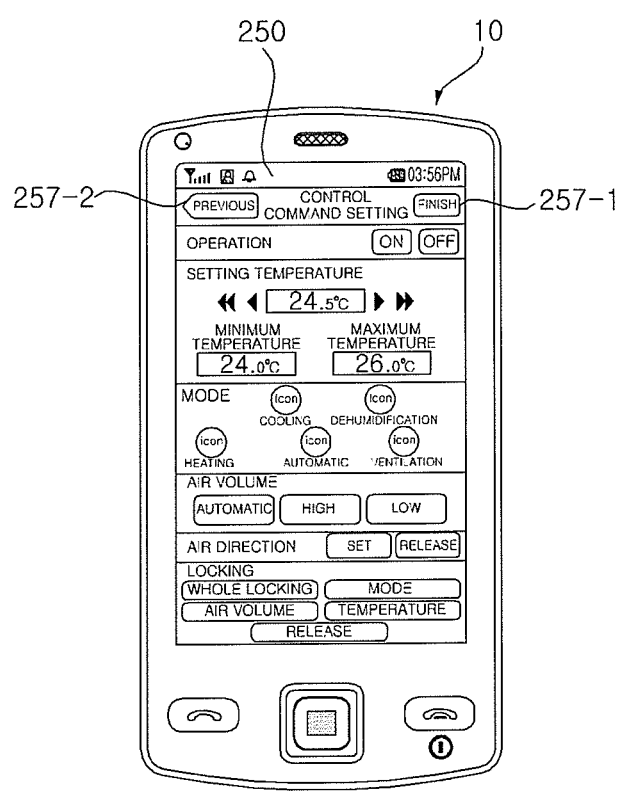

When the edit key 252 provided at a right of the control command item is selected on the detailed Q control screen, as shown in FIG. 11A, to change the control command, a control command setting screen to change a predetermined control command may be displayed, as shown in FIG. 11C.

Predetermined information may be displayed on the control command setting screen and each item may be selected such that each item has a setting value to be changed.

Whether an operation is being performed or not, temperature, a mode, air volume, an air direction, and locking may be set on the control command setting screen. The screen may be scrolled upward and downward, or dragged to move the screen.

The control command setting screen may be differently displayed based on control devices. The control command setting screen per control device has been described previously with reference to FIGS. 9A-9D.

Figure 11D:
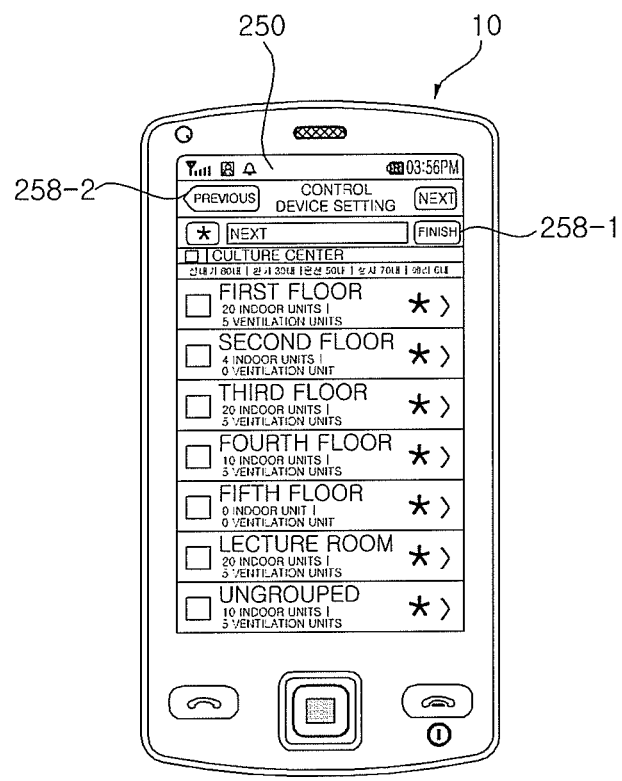

When the change of the control command is finished, an OK key or a finish key 257-1 may be input. A cancel key or a previous key 257-2 may be selected to maintain the existing setting without change. In addition, in a case in which the control device is to be changed, a control device setting screen may be displayed, as shown in FIG. 11D.

Information regarding a control device per position may be displayed on the control device setting screen and a check box may be selected to set a control device, that is, an object to be controlled. For any one of the preselected control devices, if necessary to be excluded from the objects to be controlled, a check box of the control device may be reselected to release selection of the control device.

When the change of the control device is finished, an OK key or a finish key 258-1 may be input. A cancel key or a previous key 258-2 may be selected to maintain the existing setting without change.

Figure 11E:
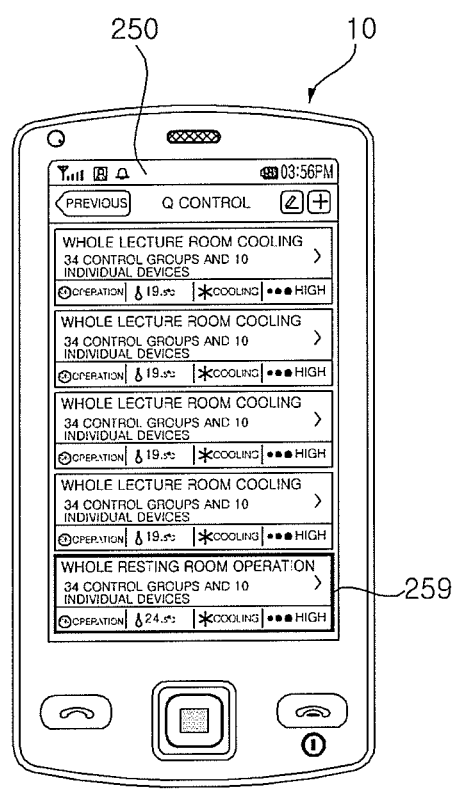

When the change of the Q control is finished as described above, changed Q control item 259 based on the changed setting may be reflected in the list and displayed, as shown in FIG. 11E. When setting of each control command and each control device is finished, the detailed information may be changed into the change information, which may be displayed, as shown in FIG. 11A. When an apply key is selected, the change may be finally finished and reflected.

In a case in which control according to the changed Q control is being already performed, that is, in a case in which the Q control is changed as described above in a state in which units of all of the resting rooms are already being performed according to the Q control to operate all of the resting rooms, a control command based on the changed Q control setting may be transmitted to a plurality of units included in the control devices or controllers to control the corresponding units. As a result, operation of the control devices may be controlled according to the changed Q control setting.

Figure 12A:
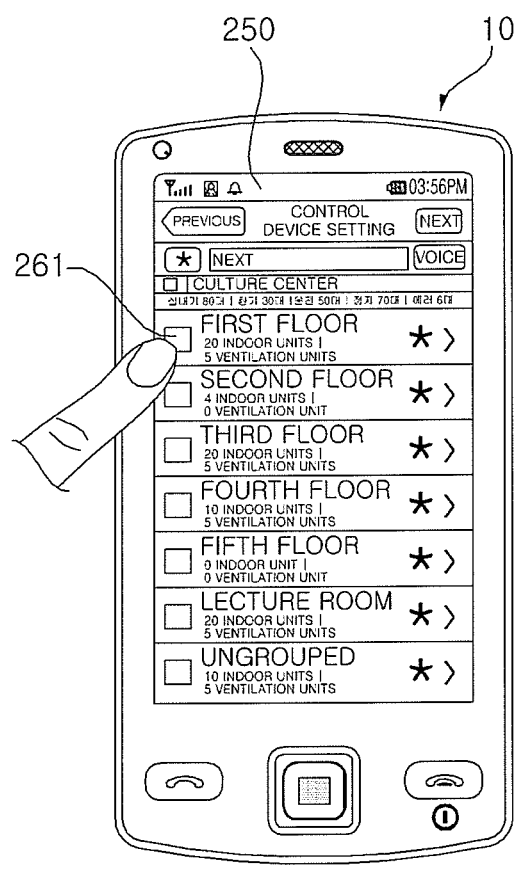

FIGS. 12A-12F are collectively a view showing a method of adding Q control during monitoring of a state of the air conditioner. As shown in FIG. 12A, the terminal may monitor an operation state of the air conditioner per site. The operation state of the air conditioner may be displayed per group or installation position through a site state menu. When an arrow displayed at a right side of each item is selected, detailed information regarding the corresponding group may be displayed.

A check box may be provided at a left side of each item of an air conditioner unit list. When the check box is selected, the selected unit may be automatically set as a control device, and therefore, addition of Q control may be possible.

Figure 12B:
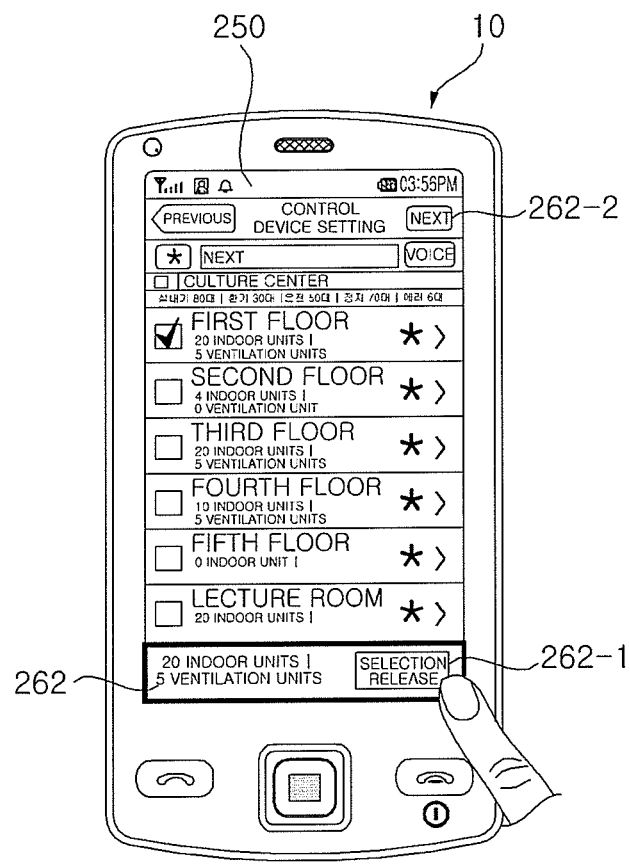

When a check box 261 of a first floor is selected, a message 262 corresponding to selection of the first floor may be displayed at a lower end of a site state screen, as shown in FIG. 12B. For example, 20 indoor units and 5 ventilation units may be installed at or on the first floor. When the first floor item is selected, a message indicating that 20 indoor units and 5 ventilation units have been selected as control devices may be displayed. At this time, a selection release key 262-1 may be displayed at a right side of the message. When the selection release key is selected, the selection of the check box may be released.

Figure 12C:
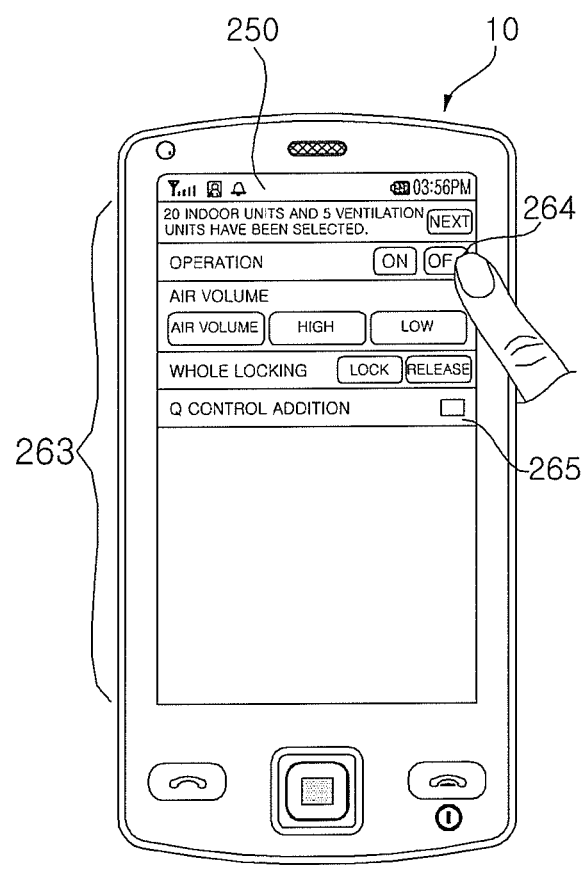

In addition, when any one item is selected as described above, a control key 262-2 provided at an upper end of the screen may be activated. When the control key is selected, a control command setting screen 263 according to addition of Q control for the control device selected through the check box may be displayed, as shown in FIG. 12C.

The number of the selected units is displayed at the upper end of the screen and operating setting for the selected units, that is, the selected control devices, may be possible. Operation ON selection key and OFF selection key 264 may be provided, and automatic, high, and low, for example, may be displayed as air volume. In addition, all locking may be selected. At this time, the control command setting screen may be differently displayed depending upon the types of the selected control devices, that is, the selected units.

Figure 12D:
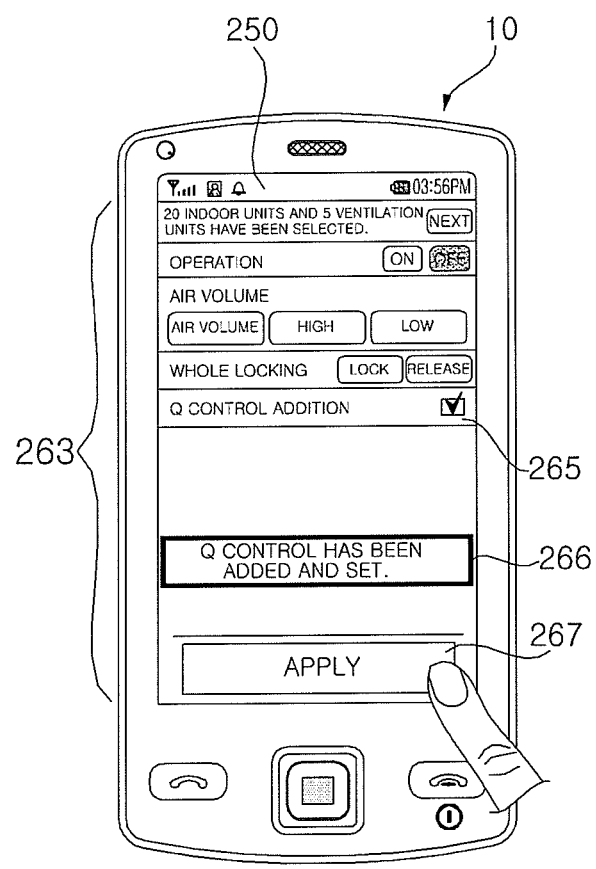

At this time, a selection box 265 for the addition of Q control may be displayed at a lower end of the screen. When the selection box 265 is selected, a guide message 266 for the addition of Q control may be displayed at the lower end of the screen, as shown in FIG. 12D. When the selection box 265 is selected and then an apply key 267 is selected, setting of Q control may be newly added. When a previous key is pushed, or cancel is selected without selection of the apply key, the addition of Q control may be canceled.

Figure 12E:
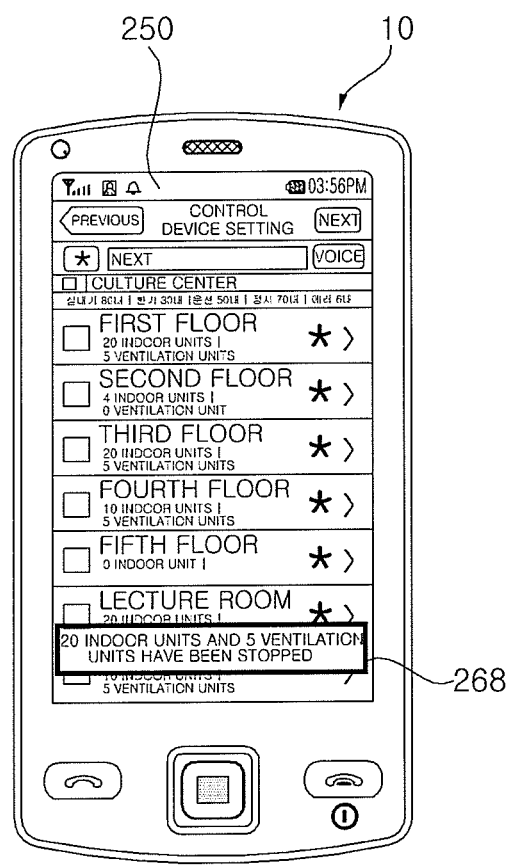

When the new Q control is added, setting of the new Q control may be immediately applied to the corresponding unit of the air conditioner as shown in FIG. 12E. For example, in a case in which Q control for operation stop is added, operations of all of the units of the corresponding first floor may be stopped. At the same time, a guide message 268 may be displayed.

Figure 12F:
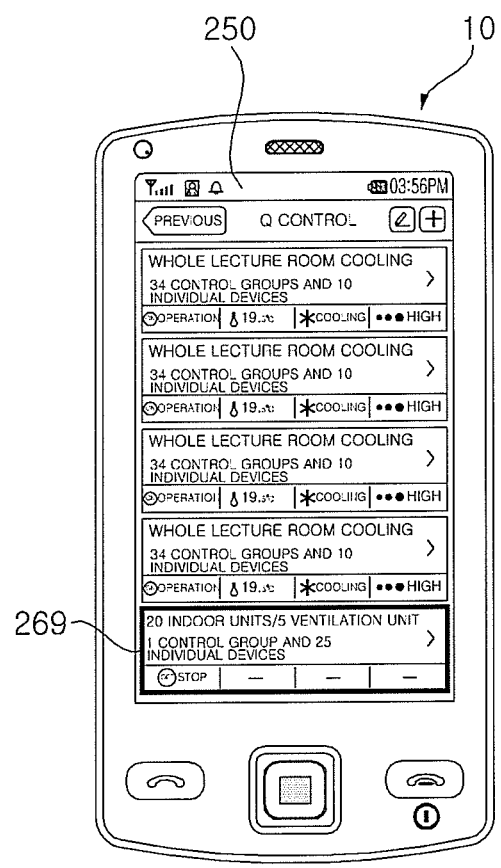

And when the new Q control is added, a new Q control item 269 may be added to the lower end of the Q control list, as shown in FIG. 12F.

When the new Q control is applied and the operations of the units are changed, as shown in FIG. 12F, state information thereof may be displayed to display that operations of all of the first floor units have been stopped.

In this way, embodiments may monitor states of the air conditioner units and controls operations of the air conditioner units through simple control setting.

Although all components constituting embodiments have been described as being combined into one component or being combined into one component and being operated as one component, embodiments are not limited thereto. According to embodiments, all components constituting each of the embodiments may be selectively coupled into one or more components and be operated as one or more components.

Although each of the components may be realized as independent hardware, some or all of the components may be selectively combined as a computer program having a program module executing some or all functions combined from one or several pieces of hardware.

Embodiments disclosed herein provide an air conditioner including a plurality of units or devices wherein the units are arbitrarily grouped irrespective of a connection state of the units to easily and rapidly control operations of the units in a remote fashion and a method of controlling the same.

Embodiments disclosed herein provide an air conditioner that may include a plurality of units or devices installed at a plurality of areas in a decentralized fashion, a plurality of air conditioner sites including the units per area, and a terminal that accesses the units and the air conditioner sites to monitor operation states of the units and the air conditioner sites and control operations of the units and the air conditioner sites. The terminal may set at least one of the units as an object to be controlled, that is, a control device, irrespective of installation positions and connection states of the units, set and store at least one control setting including a control command for the control device, and apply the control setting or releases application of the control setting using one button, such that the units set as the control device may be simultaneously operated according to the control command.

Embodiments disclosed herein further provide a method of controlling an air conditioner performed by a terminal that may include accessing a plurality of units or devices and a plurality of air conditioner sites including the units to receive operation information by executing a program provided in the terminal, displaying at least one control setting to control the units and the air conditioner sites together with the operation information as a list, immediately applying a control command to at least one unit set as a control device or releasing application of the control command for any one control setting selected from the control setting list, and transmitting the control command to the control device corresponding to the control setting to control operation of the control device.

As is apparent from the above description, in the air conditioner with the above-stated construction and the method of controlling the same, it is possible to easily and conveniently monitor and control the air conditioner at a remote place and to group and ungroup air conditioners irrespective of a real installation state and a connection state of each unit, thereby achieving rapid and convenient control of the air conditioner. In addition, it is possible to selectively group a plurality of air conditioners installed over a wide area without being restricted in one house or one building such that the air conditioners can be simultaneously controlled, thereby greatly improving convenience of control and user convenience.

Although embodiments have been disclosed for illustrative purposes, those skilled in the art will appreciate that various modifications, additions, and substitutions are possible, without departing from the scope and spirit as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner system, comprising:
a plurality of air conditioner devices installed at a plurality of air conditioner sites in a decentralized fashion; and
a terminal that accesses the plurality of air conditioner devices to monitor operation states of the plurality of air conditioner devices and control operations of the plurality of air conditioner devices, wherein the terminal sets at least one of the plurality of air conditioner devices as a control device, irrespective of installation positions and connection states of the plurality of air conditioner devices, sets and stores at least one control setting comprising a control command for the control device, and applies the control setting or releases application of the control setting such that the at least one of the plurality of air conditioner devices set as the control device is operated according to the control command,
wherein the terminal sets different control commands based on a type of the at least one of the plurality of air conditioner devices set as the control device for the control setting on a control command setting screen and sets the control commands as a function commonly applicable to the type of the at least one of the plurality of air conditioner devices, wherein the type of the at least one of the plurality of air conditioner devices is one of an outdoor unit, an indoor unit, a ventilation unit, a heat pump, a heater, an air purification unit, a humidification unit and a dehumidification unit, wherein the control command setting screen is differently displayed based on the types of control devices, wherein the terminal to perform control such that the control device comprises a unit of a first air conditioner site and a unit of a second air conditioner site among the plurality of air conditioner sites in one control setting for the air conditioner sites, wherein the terminal groups the plurality of air conditioner devices based on types and positions of the plurality of air conditioner devices to control operation of the grouped air conditioner devices, and the terminal groups the plurality of air conditioner devices irrespective of an air conditioner site in which the plurality of air conditioner devices are located, wherein when the at least one of the plurality of air conditioner devices have one or more types of the plurality of air conditioner devices, the terminal sets the control commands for a commonly applicable operating setting, air volume, and locking setting.

2. The air conditioner system according to claim 1, wherein the terminal has a program connected to the plurality of air conditioner devices over a network to monitor and control the operations of the plurality of air conditioner devices, and wherein the program provides states of the plurality of air conditioner devices, a control menu to set and control groups of the plurality of air conditioner devices, and a schedule and setting menu.

3. The air conditioner system according to claim 1, wherein the terminal displays at least one pre-stored control setting as a list and displays brief information regarding operation state information for a plurality of control setting items on the list, and when any one of the control setting list is selected, the terminal displays detailed information regarding the selected control setting.

4. The air conditioner system according to claim 1, wherein when a new control setting is created, the terminal selects a control name, a control device, and a control command, outputs detailed information regarding the new control setting, and adds the new control setting to the control setting list when the setting is finished.

5. The air conditioner system according to claim 4, wherein when the new control setting is completed, the terminal transmits the control command to the control device corresponding to the control setting such that the new control setting is immediately applied.

6. The air conditioner system according to claim 1, wherein when at least one of the plurality of air conditioner devices is selected on a monitoring screen for the plurality of air conditioner devices, the terminal creates a new control setting having the selected air conditioner device as a control device.

7. The air conditioner system according to claim 1, wherein the terminal performs the control setting for any one selected from among a building in which the plurality of air conditioner devices is located, a floor in a building on which the plurality of air conditioner devices is located, and a type of a room in which the plurality of air conditioner devices is located.

8. The air conditioner system according to claim 1, wherein the terminal sets a control command comprising an operation setting, operation modes, a setting temperature, air volume, a limit temperature, automatic setting of air volume, and locking setting for the control setting for a plurality of indoor devices.

9. The air conditioner system according to claim 1, wherein the terminal sets a control command comprising an operation setting, operation modes, air volume, extra functions, and locking setting for the control setting for a plurality of ventilation devices.

10. The air conditioner system according to claim 1, further comprising:

a server to register the terminal and to give an authority to access the plurality of air conditioner devices to the terminal, wherein the server stores operation information regarding the plurality of air conditioner devices.

11. A method of controlling an air conditioner system performed by a terminal, the method comprising:

accessing a plurality of air conditioner devices installed at a plurality of air conditioner sites in a decentralized fashion, to receive operation information by executing a program provided in the terminal;

displaying at least one control setting to control the plurality of air conditioner devices together with the operation information as a list;

applying a control command to at least one of the plurality of air conditioner devices designated as a control device or releasing application of the control command for any one control setting selected from the control setting list; and transmitting the control command to the control device corresponding to the control setting to control operation of the control device, wherein the control device is set, irrespective of installation positions and connection states of the plurality of air conditioner devices, into the control setting by the terminal, and wherein the terminal to perform control such that the device to be controlled comprises a unit of a first air conditioner site and a unit of a second air conditioner site in the control setting, the method further comprising:

displaying a control command setting screen based on the types of control devices;

setting different control commands based on a type of the at least one of the plurality of air conditioner devices set as the control device when a new control setting is created on a control command setting screen, wherein the type of the at least one of the plurality of air conditioner devices is one of an outdoor unit, an indoor unit, a ventilation unit, a heat pump, a heater, an air purification unit, a humidification unit and a dehumidification unit;

setting the control commands as functions commonly applicable operating setting, air volume, and locking setting, to the type of the at least one of the plurality of air conditioner devices, when the at least one of the plurality of air conditioner devices have one or more types of the plurality of air conditioner devices;

setting a first air conditioner device at a first air conditioner site and a second air conditioner device at a second air conditioner site as the control device when the new control setting is created;

grouping the plurality of air conditioner devices based on types and positions of the plurality of air conditioner devices to control operation of the grouped air conditioner devices; and grouping the plurality of air conditioner devices irrespective of an air conditioner site in which the plurality of air conditioner devices are located.

12. The method according to claim 11, further comprising when a new control setting is created, selecting a control name, a control device, and a control command for the new control setting, outputting detailed information regarding the new control setting, and adding the new control setting to the control setting list when the setting is finished.

13. The method according to claim 11, further comprising when the new control setting is finished, transmitting the control command to the control device corresponding to the control setting such that the new control setting is immediately applied.

14. The method according to claim 11, further comprising:

displaying the received operation information on a monitoring screen; and when the at least one of the plurality of air conditioner devices is selected on the monitoring screen, creating a new control setting having the selected air conditioner device as a control device.

15. The method according to claim 14, further comprising setting an air conditioner device of the plurality of air conditioner devices located in any one selected from among a building at which the plurality of air conditioner devices is located, a floor in a building on which the plurality of air conditioner devices is located, and a type of a room in which the plurality of air conditioner devices is located as the control device when the new control setting is created.

16. The method according to claim 11, wherein the plurality of air conditioner devices comprise one or more indoor devices, one or more outdoor devices, and/or one or more ventilation devices.

* * * * *